United States Patent
Choudhary et al.

(10) Patent No.: US 11,762,802 B2
(45) Date of Patent: Sep. 19, 2023

(54) STREAMING FABRIC INTERFACE

(71) Applicant: Intel Corporation, Santa Clara, CA (US)

(72) Inventors: Swadesh Choudhary, Mountain View, CA (US); Debendra Das Sharma, Saratoga, CA (US); Lee Albion, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 16/914,339

(22) Filed: Jun. 27, 2020

(65) Prior Publication Data

US 2020/0327088 A1 Oct. 15, 2020

Related U.S. Application Data

(60) Provisional application No. 62/944,207, filed on Dec. 5, 2019.

(51) Int. Cl.
*G06F 13/42* (2006.01)
*G06F 1/10* (2006.01)

(52) U.S. Cl.
CPC ............... *G06F 13/42* (2013.01); *G06F 1/10* (2013.01); *G06F 13/4221* (2013.01); *G06F 2213/0026* (2013.01)

(58) Field of Classification Search
CPC ........ G06F 13/42; G06F 1/10; G06F 13/4221; G06F 2213/0026; G06F 13/385; G06F 13/4009; G06F 13/4022; G06F 13/4273; G06F 13/4291; G06F 13/4295; G06F 15/163; G06F 15/17337; G06F 13/4282
See application file for complete search history.

(56) References Cited

U.S. PATENT DOCUMENTS

| 6,493,776 | B1 | 12/2002 | Courtright et al. |
| 10,073,808 | B2 | 9/2018 | Wu et al. |
| 10,552,357 | B2 | 2/2020 | Wu et al. |
| 10,678,736 | B2 | 6/2020 | Sharma et al. |
| 2006/0036816 | A1* | 2/2006 | McMahan ........... G06F 12/1458 711/E12.093 |
| 2016/0283375 | A1 | 9/2016 | Sharma et al. |
| 2020/0327084 | A1 | 10/2020 | Choudhary et al. |

FOREIGN PATENT DOCUMENTS

| EP | 3866020 A1 | 8/2021 |
| WO | 2017052661 A1 | 3/2017 |

OTHER PUBLICATIONS

EPO; Extended European Search Report issued in EP Patent Application No. 20192552.6, dated Jan. 25, 2021; 11 pages.
EPO; Extended European Search Report issued in EP Patent Application No. 23162498.2, dated Jul. 3, 2023; 12 pages.

* cited by examiner

*Primary Examiner* — Glenn A. Auve
(74) *Attorney, Agent, or Firm* — Alliance IP, LLC

(57) ABSTRACT

An interface for coupling an agent to a fabric supports a load/store interconnect protocol and includes a header channel implemented on a first subset of a plurality of physical lanes, the first subset of lanes including first lanes to carry a header of a packet based on the interconnect protocol and second lanes to carry metadata for the header. The interface additionally includes a data channel implemented on a separate second subset of the plurality of physical lanes, the second subset of lanes including third lanes to carry a payload of the packet and fourth lanes to carry metadata for the payload.

21 Claims, 20 Drawing Sheets

STREAMING FABRIC INTERFACE

RELATED APPLICATIONS

This application claims benefit to U.S. Provisional Patent Application Ser. No. 62/944,207, filed Dec. 5, 2019, the disclosure of which is considered part of and is hereby incorporated by reference in its entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
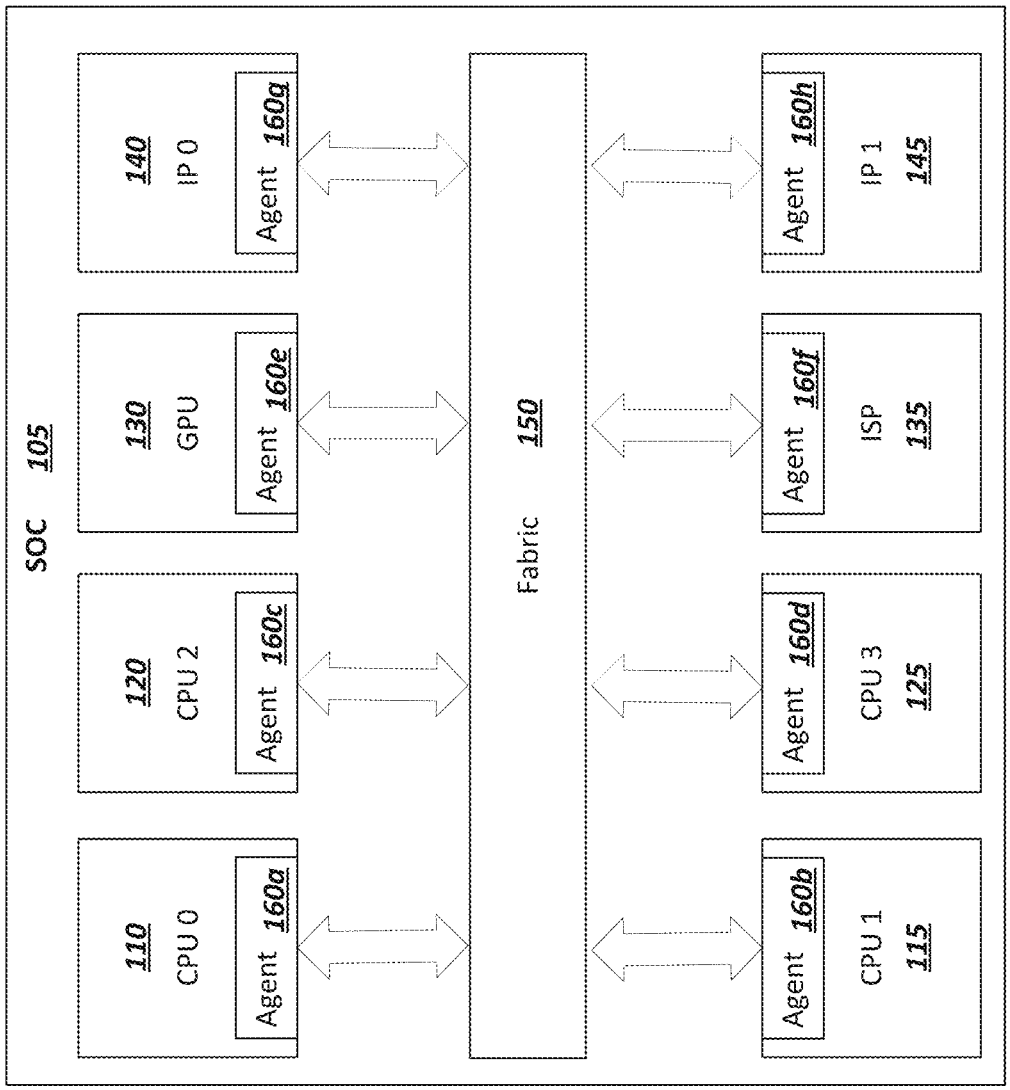
FIG. 1 is a simplified block diagram illustrating an example embodiment of a system on chip (SoC) device.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to efficient high-speed data transmission and configurability in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments may be applied to computing systems embodied as servers, blades, desktop computer systems, system on chip (SoC) device, handheld devices, tablets, set top boxes, in-vehicle computing systems, computer vision system, gaming systems, machine learning systems, and embedded applications. As will become readily apparent in the description below, the embodiments of methods, apparatus', and systems described herein (whether in reference to hardware, firmware, software, or a combination thereof) are beneficial to the development of high-performance computer interconnects and their respective systems.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the solutions described herein.

One example interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Traditional streaming interfaces to couple fabric to protocol agents have generally included proprietary interfaces (e.g., Intel™ On-chip System Fabric (IOSF™)), interfaces developed for coherent or unordered protocol, and other interfaces that are poorly adapted to scaling to handle the evolving data rates in modern protocols and architectures. For instance, proprietary interfaces may carry custom or use-case specific information or features that prevent standardization of the interface or that fail to scale to next generation bandwidths. While other traditional interface may be defined in a more generic manner, for instance, as a data bus for carrying packets. However, traditional bus definitions and interfaces may lead to receiver decode complexity, particularly in the presence of multiple flow control classes or virtual channels, especially as data rates increase and more packets are able to be processed per clock cycle. As an example, if four (or even more) packets of any channel or flow control can potentially arrive at a given clock cycle, and these were accessing shared buffers, then a corresponding four (or more) logical write ports may need to be provisioned in the receiver, resulting in excess surface area dedicated to providing such logic (and buffers). In some instances, traditional interfaces address use cases where multiple packets per cycle (of different flow control classes) simply by stamping multiple copies of the interface (e.g., one for each flow control class), leading to high pin counts. Additionally, traditional streaming interfaces have header and data packets following each other on the same physical wires, limiting the potential for latency optimizations. Some traditional interfaces fail to provide effective, flexible mechanisms for crediting flows, among other example shortcomings.

In some implementations, an improved, scalable streaming interface may be defined between agent logic on a device and a fabric, such as between the protocol layer and other devices coupled to a fabric (e.g., a CPU, endpoint device, switch, etc.). The streaming interface may support a load/store protocol, such as PCIe, Compute Express Link (CXL) (e.g., CXL.io), among other load/store protocols. The improved streaming interface may define interface rules and channels of the interface to enable significant chip area and latency advantages during implementation, while providing the power-efficient bandwidth scaling advantages that will become ever more critical, particularly as protocols approach higher speeds, such as the move to 32.0 GT/s in PCIe Gen 5, or to 64.0 GT/s Data Rates and beyond starting with PCIe Gen 6 and CXL 3.0, among other examples. Such an interface may optimize the best balance of pin count versus receiver decoding complexity. In some implementations, the improved streaming interface discussed herein may allow a modest number of logical write ports on receiver buffers, where the receiver buffers are shared amongst multiple virtual channels and flow control classes. Further, an improved streaming interface may bifurcate the header and data of packets into independent physical channels (e.g., a header channel and a data channel) to thereby allow the receiver to start processing the headers while data is still streaming in and thereby helps reduce overall latency and buffer sizing and complexity. Further, the improved streaming interface discussed herein may be standardized to enable ecosystems of IP blocks to adopt and develop to a scalable, standardized interface, rather than traditional proprietary interfaces, and allow more options of interoperability, among other example features and advantages, such as discussed herein.

Turning to the simplified block diagram 100 of FIG. 1, a simplified example of a system on chip (SoC) device 105 is illustrated. An SoC map be implemented as an integrated circuit that incorporates multiple components of a computer, or computing blocks (or intellectual property (IP) blocks). Such blocks (e.g., 110, 115, 120, 125, 130, 135, 140, 145) may include components such as one or more CPU components 110, 115, 120, 125 (e.g., a microprocessor or microcontroller), special purpose processors 130, 135 (e.g., graphics processing units (GPUs), image signal processors (ISPs), tensor processor units, accelerator devices, etc.), memory components, input/output (I/O) ports, secondary storage blocks, and other compute blocks on a single die or substrate, such as a silicon die.

Compute blocks (e.g., 110, 115, 120, 125, 130, 135, 140, 145) of an example SoC 105 may be interconnected by an SoC fabric (e.g., 150). The fabric 150 may be implemented itself using a set of one or more IP blocks facilitating communication between compute blocks (e.g., 110, 115, 120, 125, 130, 135, 140, 145). In some implementations, the fabric 150 may be implemented as a network on chip (NOC), such as a NOC implemented one or more circuitry blocks.

Communication by the various blocks (e.g., 110, 115, 120, 125, 130, 135, 140, 145) may be facilitated through protocol agents (e.g., 160*a-h*) provided on the blocks (e.g., 110, 115, 120, 125, 130, 135, 140, 145). Each agent (e.g., 160*a-h*) may include logic (e.g., implemented in hardware circuitry, firmware, and/or software) to implement all or a subset of layers of one or more interconnect protocols (e.g., PCIe, Compute Express Link (CXL), Gen-Z, OpenCAPI, In-Die Interface, Cache Coherent Interconnect for Accelerators (CCIX), UltraPath Interconnect (UPI), etc.) through which the corresponding compute block is to communicate with other compute blocks in the system. As discussed herein, the agents may couple to the fabric 150 via a respective interface. While such agents may have traditionally coupled to fabrics via proprietary wire interfaces, one or more agents (e.g., 160*a-h*) may utilize respective instances of a configurable flexible on-die wire interface, which may be deployed to support the multiple different protocols of multiple different agents of the SoC 105. In other instances, interfaces between agents (e.g. 160*a-h*) may be to support non-coherent and/or load/store streaming protocols, and corresponding streaming fabric interfaces may be defined and implemented on the blocks (e.g., 110, 115, 120, 125, 130, 135, 140, 145) and the fabric 150, among other example implementations.

As introduced above, an improved streaming fabric interface architecture (SFI) may be provided in components of a system (e.g., IP blocks and components implementing the fabric of the system) to map Load/Store protocols (e.g., PCIe, CXL.io) between an agent and a fabric. An SFI interface may provide a scalable streaming interface that can sustain the high bandwidth requirements of Load/Store protocols, including emerging next generation speeds for such protocols. An SFI interface may enable ease of implementation on both the transmit and receive side when transmitting such high data rates. Additionally, the logic implementing the SFI interface may embody, realize, and enforce rules for communications on the interface (e.g., beyond those defined in the protocols supported by the interface) to greatly simplify storage overhead in the context of read/write ports on the receiver, among other example advantages.

An SFI interface may be employed both in the context of a host CPU (e.g., through the root complex) or in the context of a device endpoint. In both cases, SFI serves to carry protocol layer (transaction layer) specific information between different processing entities. As an example, on the device side, SFI can be used to interface between the PCIe controller and the application layer (e.g., the fabric or a gasket layer between the controller and the fabric). Similarly, on the host side, SFI can be used to interface between the PCIe Root Port and the CPU fabric. Configurable parameters may be defined in an SFI interface to allow instances of the interface to be parametrized to be wide enough and carry multiple packets in a single transfer according to the supported protocols and the system use case(s). On a given SFI interface, data transfer may be unidirectional. Accordingly, in some implementations, a pair of SFI interface instances may be provided (one in each direction) to facilitate implementations utilizing bidirectional data transfer between communicating blocks. Accordingly, many of the examples herein discuss a transmitter (TX) and receiver (RX) pair for a single instance of an SFI interface.

Figure 2:
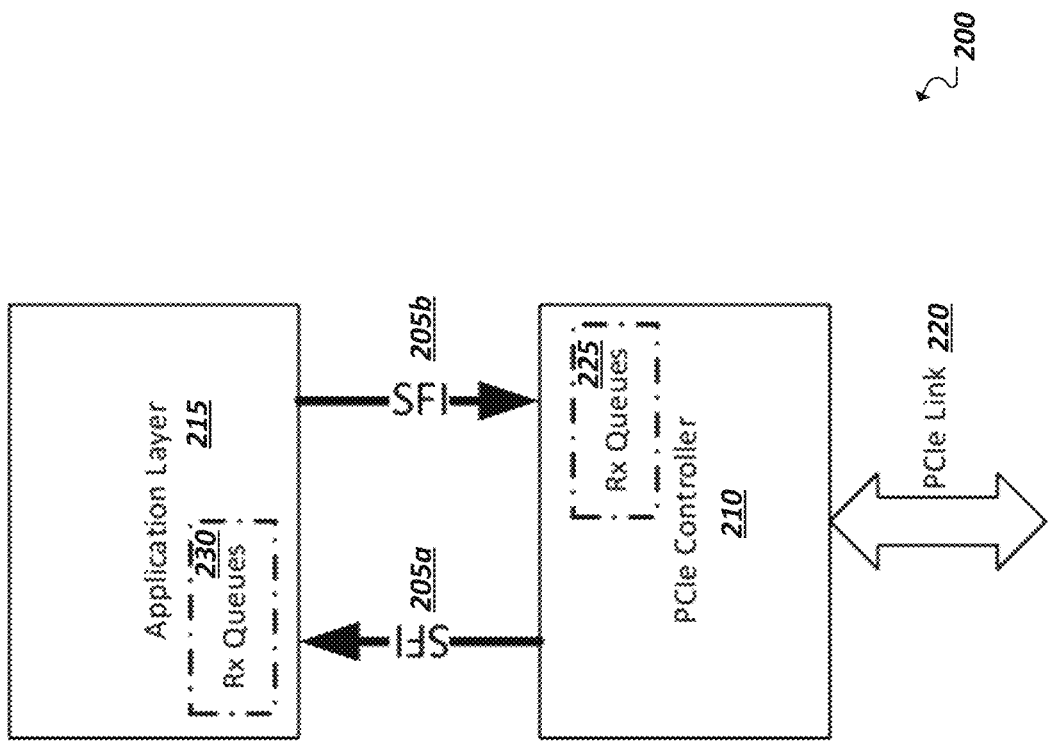
FIG. 2 is a simplified block diagram of an streaming fabric interface.

Different configurations can be enabled using SFI as the intermediate interface. For instance, an SFI interface may make no assumptions around protocol- or application-specific responsibilities of the transmitter and receiver of the interface. Rather, an SFI interface may simply provide a mechanism and rules for high bandwidth packet transfer. For instance, FIG. 2 is a simplified block diagram 200 illustrating an example implementation coupling a controller 210 (e.g., of an agent) to an application layer 215 (e.g. implemented through a fabric) via two SFI interface instances 205*a*, 205*b*. The controller 210 may include protocol circuitry or other logic to establish a link 220 according to a particular interconnect protocol (e.g., PCIe) and participate in initialization, training, and communications over the link 220. The example of FIG. 2 may represent an example use case of SFI in a PCIe application. SFI instance 205*a* may treat the PCIe controller 210 as the transmitter and the application layer element 215 as the receiver. Accordingly, application layer element 215 may include a receiver buffer for the SFI interface 205*a* for use in maintaining flow control credits (including shared credits for the channels of the SFI interface 205*a*). Similarly, SFI interface 205*b* may regard the application layer element 215 as the transmitter and the PCIe controller 210 as the receiver (and the controller 210 may include corresponding receiver queues or buffers 225 for use with the interface 205*b*).

While some implementations of SFI may utilize semantics and header formats of a PCIe-based protocol, SFI is not limited to supported PCIe-based protocol. Further, SFI does not contain a new protocol definition. SFI semantics can be used to support a variety of different protocols, provided the protocol can be mapped to or adapted to the flow control (FC) and virtual channel (VC) semantics that SFI provides, among other example features. For instance, SFI supports advertisement of 0 or more shared credit pools for the receiver queues (such as discussed in more detail below).

Figure 3:
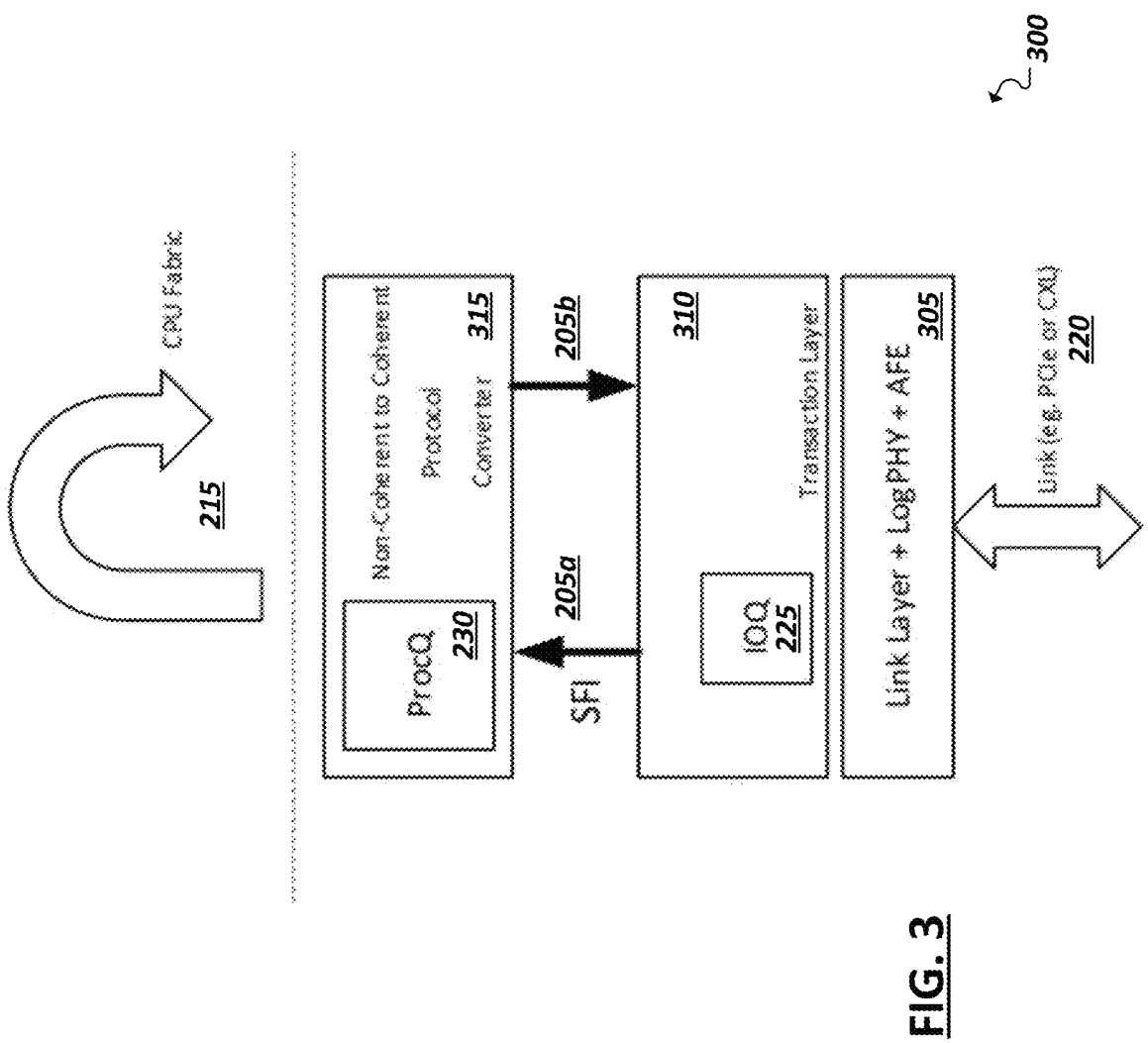
FIG. 3 is a simplified block diagram of another example streaming fabric interface.

Turning to FIG. 3, a simplified block diagram 300 is shown illustrating a traditional root complex stack utilizing an SFI interface. For instance, SFI interfaces 205*a*, 205*b* may be used to couple protocol stack logic (e.g., 305, 310) to a non-coherent to coherent protocol converter 315 (e.g., which may sit between the protocol stack logic and the interconnect fabric 215 of the system. For instance, protocol stack logic may be embodied as an agent or controller for a particular non-coherent, load/store interconnect protocol (e.g., PCIe, CXL.io, etc.) and may include lower level layer logic 305 (e.g., implement in circuitry) including physical layer logic and link layer logic. Transaction layer logic 310 may also be provided and may be the layer that interface with the converter 315 over the SFI interface (e.g., 205*a*, 205*b*). Buffers 225 (e.g., I/O/queue (IOQ) buffers may be provided and used to hide the physical link latency between device and host. The depth of such buffers 225 is typically shallow and the number of logical write ports needed are the number of concurrent packets available from the link in 1 clock cycle. For instance, in one example, for PCIe Gen5 speeds (32 GT/s), up to 4 packets can arrive in one 1 GHz cycle, so 4 logical ports would be needed in such an example in order to process these packets concurrently, given that the packets could potentially be of different flow control classes and/or virtual channels. Fabric-side buffers 230 (e.g., ProcQ buffers), on the other hand, may be implemented as deep buffers that are used to hide the CPU fabric latencies (e.g., for inbound writes, that translates to the latency of fetching ownership requests and committing data to coherency domain). These may one or multiple write ports. In implementations with split queues, SFI semantics may allow further optimizations (e.g., on the ProcQ side to perform "batch processing" of transactions). Indeed, SFI semantics are oriented to improve buffer implementations in a variety of system configurations, providing a balance of receiver complexity with bandwidth scaling capabilities, among other example advantages.

Among the example features adopted in an example, improved SFI interface, receiver decoding may be simplified, with the interface scaling to support a wide range of data payloads (e.g., from as small as 4B to as large as 4 KB (or larger)). An improved streaming interface may allow multiple packets to be delivered in the same cycle, allowing a scalable interface across a variety of payload sizes while maintaining a common set of semantics and ordering (e.g., PCIe-based, etc.). Configurable parameters may include the number of logical write ports at the receiver (e.g., 1 or 2), which may be supported by defining rules for the interface restricting the number of different packets or headers transmitted in a clock cycle to using a corresponding number of flow control classes and/or virtual channels. Reducing the number of logical write ports at the receiver may save significant area and complexity. Additionally, as noted above, an improved streaming interface may enable header processing (e.g., of header received over a dedicated header channel) at the receiver to begin while data is streaming in to improve latency (e.g., in the case of CPU Host, to help overlap ownership request latency with an incoming data stream.

Compute Express Link, or CXL, is a low-latency, high-bandwidth discrete or on-package link that supports dynamic protocol multiplexing (or muxing) of a coherency protocol (CXL.cache), memory access protocol (CXL.mem), and I/O protocol (CXL.io). CXL.cache is an agent coherency protocol that supports device caching of host memory, CXL.mem is a memory access protocol that supports device-attached memory, and CXL.io is a PCIe-based non-coherent I/O protocol with enhancements for accelerator support. CXL is intended to thereby provide a rich set of protocols to support a vast spectrum of devices, such as accelerator devices. Depending on the particular accelerator usage model, all of the CXL protocols (CXL.io, CXL.mem, CXL.cache) or only a subset may be enabled to provide a low-latency, high-bandwidth path for a corresponding computing block or device (e.g., an accelerator) to access the system.

Figure 4:
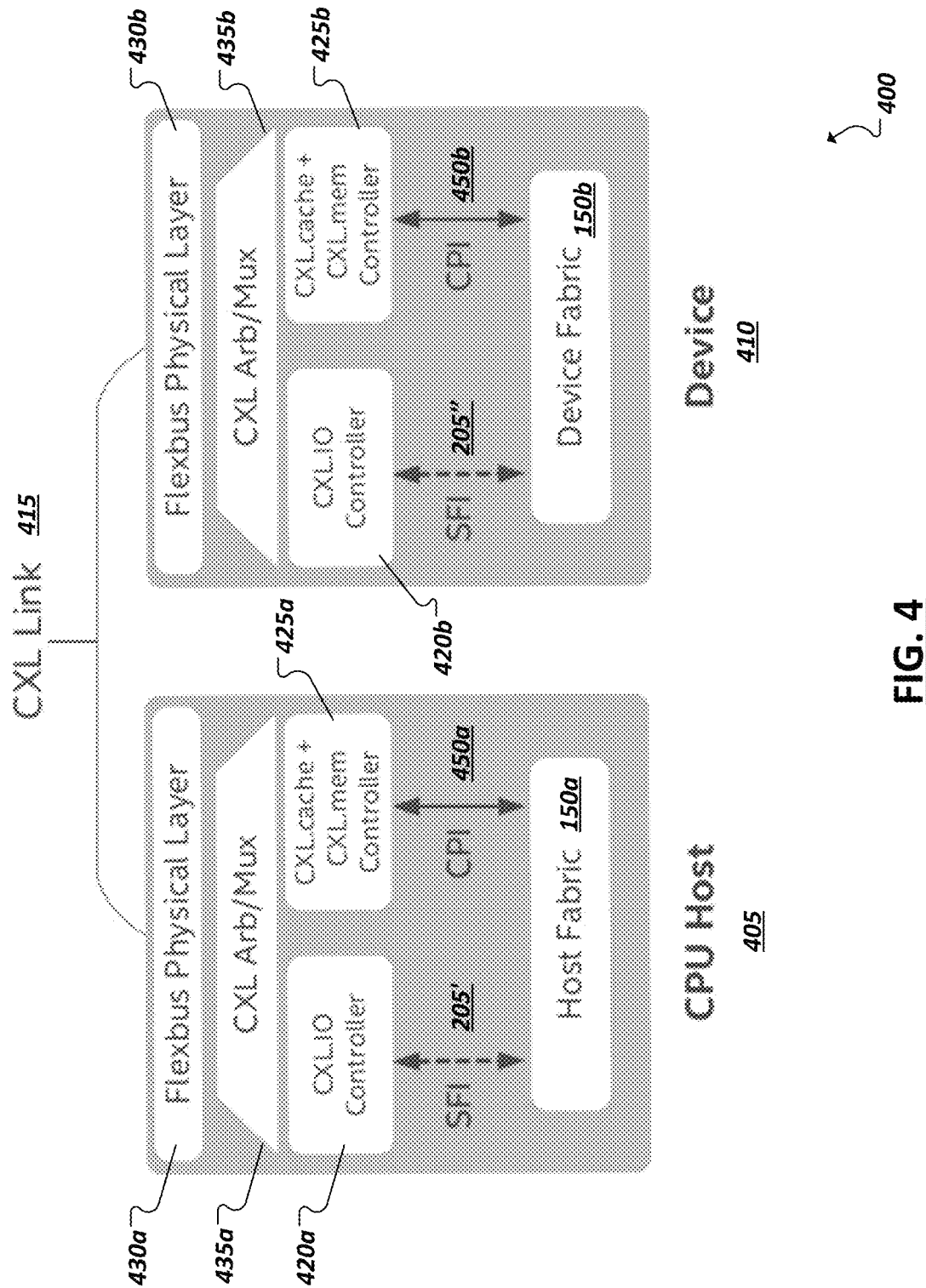
FIG. 4 is a simplified block diagram illustrating an example Compute Express Link (CXL) topology.

As noted above, in some implementations, agents utilized to implement a CXL.io protocol may couple to system fabric utilizing an SFI interface, such as described herein. For instance, turning to FIG. 4, a simplified block diagram 400 is shown illustrating example CXL agents and the coupling of such agents to a fabric. FIG. 4 shows an example system topology for ports supporting a CXL link 415. For instance, a CXL link 415 may couple a CPU host device 405 to another device 410 (e.g., a memory device or accelerator device). Each agent (on devices 405, 410) may include link layer logic (e.g., 420a-b, 425a-b) to support each of the sub-protocols of CXL (e.g., CXL.io, CXL.mem, CXL.cache). In the case of CXL.mem and CXL.cache, a common controller (e.g., 425a-b) may be utilized. For CXL.io, a controller 420a-b may be provide that is separate from the coherent CXL.mem and CXL.cache protocols. Protocol multiplexing may be facilitated through CXL arbitration/multiplexing logic (e.g., 425a-b, implemented, in hardware circuitry), which interfaces with a Flex Bus physical layer (e.g., 430a-b). Flex Bus may be implemented as a flexible high-speed port that is statically configured to support either PCIe or CXL. Flex Bus allows for either a PCIe protocol or CXL protocol to be sent over a high-bandwidth, off-package link. The protocol selection in the Flex Bus PHY 430a-b may take place during boot time via auto negotiation, based on the application.

Continuing with the example of FIG. 4, a first interface type 450a, 450b is used for coherent protocols such as CXL.cache and CXL.mem, whereas another different wire interface definition (e.g., 205', 205") (e.g., an SFI interface) is used for load/store protocols like PCIe and CXL.io. In one example, SFI 205', 205" serves as an intermediate interface, which makes no assumptions around protocol- or application-specific responsibilities between the transmitter and receiver and provides a scalable streaming interface that can sustain high bandwidth requirements of load/store protocols (e.g., PCIe, CXL.io, etc.). SFI does not contain a standalone protocol definition, the SFI semantics provided to support different protocols capable of being mapped to the flow control and virtual channel semantics provided by the SFI definition, among other examples and interface implementations.

As shown in FIG. 4, a system may employ example interface 450a, 450b to allow wires to be shared at the fabric and achieve wire efficiency at the fabric and agent perimeters by allowing different coherent protocols to share common wires. For instance, the channels of various protocols originating from agents may be carefully mapped to a minimal set of physical channels and virtual channels, so that the bandwidth and channel isolation requirements of the agents and protocols are satisfied with the lowest total wire count. The interface 450a, 450b may these multiple protocols to a common set of channels and use common flow control and virtualization features on these channels, among other example implementations.

In some implementations, an improved streaming interface may be implemented that is adapted to support a load/store protocol based at least in part on PCIe or PCIe semantics (e.g., PCIe or CXL.io). For instance, a supported protocol may utilize packet formats based on PCIe-defined formats. Additionally, Flow Control/Virtual Channel notions may be extended from PCIe definitions. It should be appreciated that other, additional protocols (e.g., non-PCIe or CXL protocols) may also be supported by such SFI interfaces. Indeed, while many of the examples discussed herein reference PCIe- or CXL.io-based protocols and implementations, it should be appreciated that the principles, features, and solutions discussed herein may be more generally applied, for instance, to a variety of other streaming or load/store protocols, among other example systems.

In some implementations, an SFI interface may have separate Header (HDR) and Data buses or channels, each of which can carry multiple packets' headers or payloads concurrently. Further, formalized rules may be set and adopted in logic of the agent to govern how packets are packed/unpacked on the header and data interfaces. For instance, an additional metadata channel, or bus, may be provided on the improved interface to carry metadata to enable the receiver to identify how to unpack the headers/data sent on the separate header and payload data channels respectively. Through separate, parallel header and data channels a system (e.g., the root complex of a CPU host) may enjoy latency benefits, for instance, by receiving potentially multiple headers before the corresponding payload is received. This resulting lead time may be used by the system to process the headers and start fetching ownership for the cache lines for multiple header requests, while the data of those requests is still streaming in. This helps overlap latencies and helps reduce buffer residency, among other example advantages.

Figure 5:
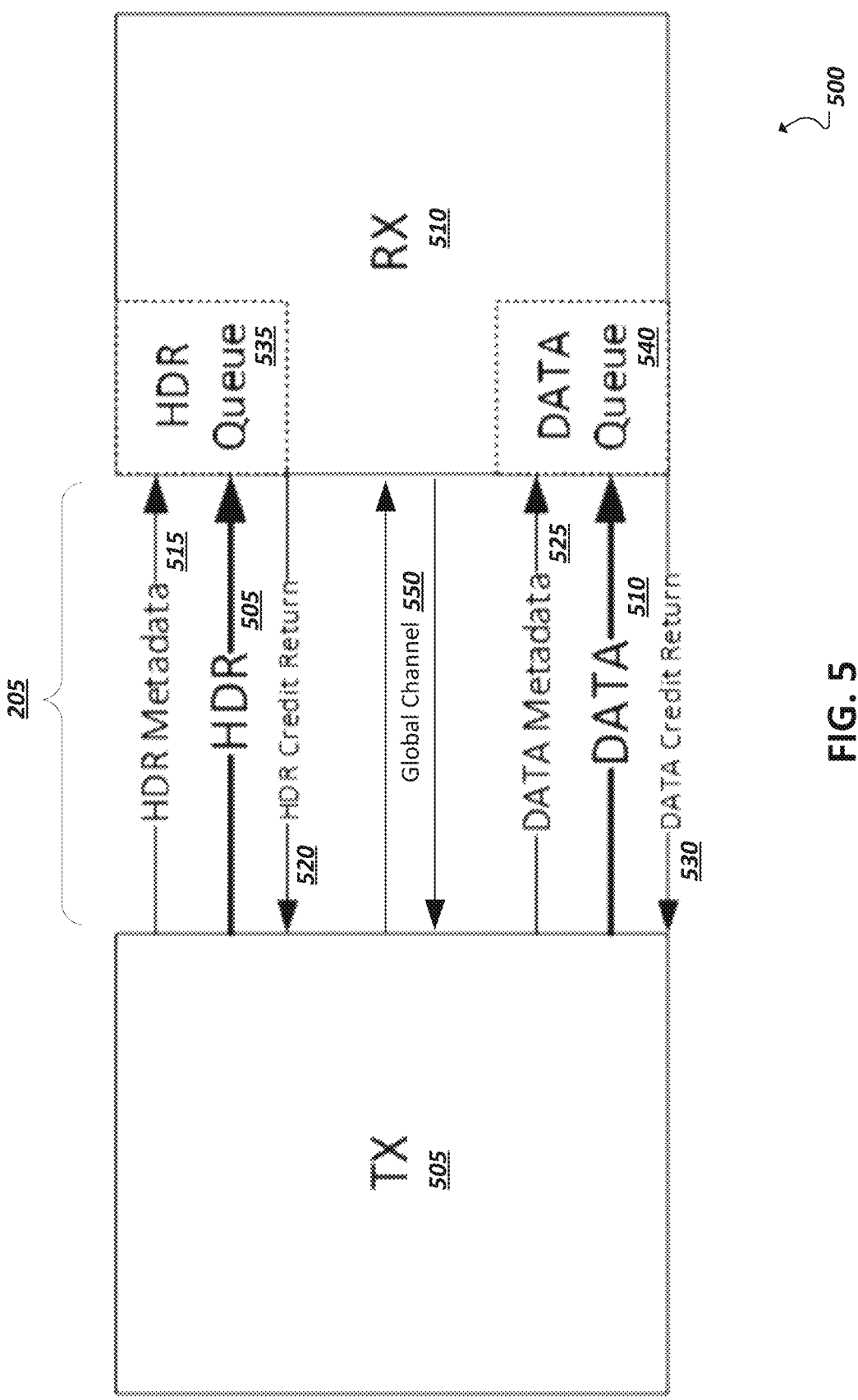
FIG. 5 is a simplified block diagram of channels of an example streaming fabric interface.

Turning to FIG. 5, a simplified block diagram 500 is shown illustrating an example implementation of an SFI interface. For instance, in each instance of an SFI interface, a set of physical lanes (e.g., wires or other conductors) may be provided and assigned to various channels, which embody logical sets of signals defined for the interface and assigned to respective physical lanes of the interface. Each device may possess pins and corresponding SFI logic (implemented in hardware circuitry and/or software) to implement its end (the transmitter or receiver), or instance, of the interface and couple to the physical lanes embodying the connection between the transmitter and receiver on the interface. An SFI interface instance may additionally define two channels for the sending of packets or other data transfer messages from the transmitter to the receiver. Specifically, in some implementations, the SFI interface 205 may include a Header (HDR) channel that embodies a set of signals (e.g., 505, 515, 520) that are respectively a first set of multiple lanes of the interface for use in sending header data for the packet. The SFI interface additionally includes a Data (DATA) channel that embodies another set of signals (e.g., 510, 525, 530) that are mapped to an additional set of multiple lanes of the interface 205 and are for use in sending payload data for the message. Signals of the HDR channel may include a main HDR signal 505 to carry a header itself, as well as a header metadata signal 515, and a header credit return signal 520 (directed from the receiver to the transmitter). Similarly, the DATA channel may also include a main DATA signal 510 to carry the payload data, as well as a data metadata signal 525, and a data credit return signal 530 (also directed from the receiver to the transmitter), among other examples signals. In some implementations, an SFI interface 205 may additionally include a global channel or layer (e.g., 550) which includes bidirectional control signals that apply across all physical channels (e.g., HDR and DATA) of the interface. For instance, the global channel may carry a set of global control signals that may be used to perform initialization or shutdown of the interface, communicate controls or parameters for the interface, among other features.

Each of the HDR and DATA channels can carry multiple packets on the same cycle of transfer. Since most Load/Store protocols rely on ordering semantics, SFI assumes implicit ordering when multiple packets are sent on the same cycle. Packets may be ordered, for instance, from the least significant position to the most significant position. For example, if TLP 0 begins from byte 0 of the header signal 505 and TLP 1 begins from byte 16 of the header signal 505, then the receiver considers TLP 1 to be ordered behind TLP 0 when such ordering rules are applied. For transfers across different clock cycles, the ordering rules of the relevant protocol are followed (e.g., SFI carries over all PCIe ordering rules when used for PCIe). In cases of link subdivision (e.g., dividing the overall lanes of the link into two or more smaller-width links (e.g., associated with respective root ports), the different ports from the controller perspective map to different virtual channels on the SFI. For instance, in such cases, implementations can support multiple port configurations within the same physical block (e.g., implemented as an agent or controller). In these cases, the same physical channel of SFI can be used to transfer packets for different ports, with each port mapped to its own set of virtual channels (e.g. 1 or more virtual channels per port), among other example implementations.

A set of parameters may be defined for an instance of an SFI interface to configure aspects of the instance. For instance, metadata signals of the HDR and DATA channels may be based on one or more of the configurable parameters. For instance, parameters may identify how the metadata signals carry metadata to convey information about the position of different packets within a single transfer, among other example information. For instance, in SFI, packet headers that have data associated with it send the packet header on the HDR channel and send the associated data separately on the DATA channel. There may be no timing relationship guarantee between the DATA and HDR channel transfers. It is assumed that the receiver tracking the associated data length for each received header and only processing the relevant data size. The data size may be sent with the packet header information (e.g., a PCIe implementation, using a PCIe packet header format identifies the amount of data in the length field of the PCIe TLP header to indicate how many 4-byte chunks of data are associated with that header). Information in the metadata sent over the metadata signals may also be used by the receiver to determine which headers map to which data (e.g., through flow control and virtual channel ID combinations), parity information, information about the header format (e.g., the header size), among other example information.

A global layer or channel of signals (e.g., 550) may carry signals that apply across all physical channels of the interface 205, such as control signals, vendor-defined signals, and other signals enabling other example functionality. For instance, the global channel 550 may carry the signals that are also used for initialization and shutdown of the interface (such as in the examples discussed below). Table 1 describes an example implementation of signals of a global channel of an example SFI interface.

TABLE 1

Signals of the Global Layer

| Signal Class | Signal Name | Width | Direction | Description |
|---|---|---|---|---|
| Init | txcon_req | 1 bit | Tx → Rx | Connection request from transmitter (0 → 1 connection request, 1 → 0 disconnection request) |
|  | rxcon ack | 1 bit | Rx → Tx | Connection acknowledge from receiver (0 → 1 connection acknowledge, 1 → 0 disconnection acknowledge) |
|  | rxdiscon nack | 1 bit | Rx → Tx | Disconnection NACK from receiver |
|  | rx_empty | 1 bit | Rx → Tx | Receiver queues are empty for all channels and all credits have been returned |
| Vendor Defined | tx vendor field | VT bits | Tx → Rx | Optional signal to send static/global vendor-defined information from TX to RX. |
|  | rx vendor field | VR bits | Rx → Tx | Optional signal to send static/global vendor-defined information from RX to TX. |

The HDR channel carries the header of request messages from the transmitter to the receiver. A variety of information may be encapsulated in the (protocol-specific) fields of a header transmitted using the HDR channel, including address and other protocol-level command information. Table 2 describes an example implementation of signals of an HDR channel of an example SFI interface.

TABLE 2

Fields of the HDR Layer

| Signal Class | Signal Name | Width | Description |
| --- | --- | --- | --- |
| VALID | hdr_valid | M bits | Indicates the start of a new packet on the corresponding header byte. Has a fixed association between the individual bits of hdr_valid and the bytes of header. |
| HDR | header | H bytes | Header information. It can contain multiple packets transferred in the same cycle. FC and VC information is embedded in the header information |
| HDR_METADATA | hdr_info_bytes | 2*M bytes | Indicates header size, flow control, virtual channel, and parity information. |
| CREDIT | hdr_crd_rtn_valid | 1 bit | Credit return valid |
| | hdr_crd_rtn_fc_id | 4 bits | Identifies the flow control class for this credit return |
| | hdr_crd_rtn_vc_id | 4 bits | Identifies the virtual channel for this credit return |
| | hdr_crd_rtn_value | N bits | Indicates how many credits are returned in this cycle |

The header size may be a predetermined parameter based on the peak sustained bandwidth expected or required of the system. An SFI interface (and corresponding logic) may enforce rules for the HDR channel such as having a packet header begin and end on the same cycle of transfer. Multiple packet headers may nonetheless be sent on the same cycle by sending one of the packet headers on a first subset of the header signal lanes and the other packet header on another subset of the header signal lanes. The interface may define, however, that the first packet on a valid header transfer starts on the lanes of the header signal corresponding to byte 0 of the header field (logically represented by the header signal lanes).

The header valid signals (hdr_valid) may be asserted to indicate corresponding valid values on the lanes of the header signal. In some implementations, the number of lanes of the header signal may be logically divided into byte-wise subsets (e.g., 16 bytes or 32 bytes of lane width in each subset) corresponding to the size of one of the protocol headers to be carried on the header signal. Further, each header valid lane may be mapped to one of the subsets to indicate that valid header data is being sent on a corresponding one of the subsets of lanes of the header signal. Additionally, the header metadata signal (hdr_info_bytes) may carry metadata (e.g., aligned with one of the headers carried on the header signal) to describes key attributes that can be used by the receiver to decode the corresponding header.

A DATA physical channel of an SFI interface may be used to carry payload data for all requests that have data associated with it. In SFI, there may be no explicit timing relationship or requirement between the HDR channel and associated data carried on the DATA channel. However, transmitters may be equipped with logic to check both HDR channel and DATA channel credits before scheduling either header data on the HDR channel or payload data on the DATA channel. Table 3 describes an example implementation of signals of a DATA channel of an example SFI interface.

TABLE 3

Fields of the DATA Channel

| Signal Class | Signal Name | Width | Description |
| --- | --- | --- | --- |
| VALID | data_valid | 1 bit | Indicates the start of a new packet on the corresponding header byte. Has a fixed association between the individual bits of hdr_valid and the bytes of header. |
| DATA | data | D bytes | Header information. Contains multiple packets transferred in the same cycle. FC and VC information is embedded in the header information |
| DATA_METADATA | data_start | DS bits | Indicates the start of a new data packet on the corresponding data byte. Have a fixed association between the individual bits of data_start and the bytes of data. The parameter DS is determined by the maximum number of separate packets that need to be sustained per cycle. |
| | data_info_byte | DS*8 bits | For every data_start bit, there is a data_info_byte, which indicates the FC ID and the VC ID of the associated data packet. |
| | data_end | DE bits | Indicates the end of a new data packet on the corresponding data 4 byte chunk. Has a fixed association between the individual bits of data_end and the bytes of data. The parameter DE is determined by the total data width D divided by the size of a defined chunk of data (e.g., a 4 byte |

TABLE 3-continued

Fields of the DATA Channel

| Signal Class | Signal Name | Width | Description |
| --- | --- | --- | --- |
| | | | chunk), since any of the quantized chunks of data can be the last data chunk. |
| | data_poison | DE bits | Indicates one or more bytes of the associated data packet is poisoned. Rx treats the entire payload as poisoned. |
| | data_ecrc | DE bits | If error correction code is supported, it is asserted when the corresponding bit of data_end is asserted, and indicates that the last chunk of data carries the error correction code (e.g., end-to-end cyclic redundancy check (ECRC) code). |
| CREDIT | data_crd_rtn_valid | 1 bit | Credit return valid |
| | data_crd_rtn_fc_id | 4 bits | Identifies the flow control class for this credit return |
| | data_crd_rtn_vc_id | 4 bits | Identifies the virtual channel for this credit return |
| | data_crd_rtn_value | N bits | Indicates how many credits are returned in this cycle |

In implementations of an SFI interface, payload data may be sent on the data signal of the DATA channel according to a multi-byte granularity (e.g., 4-byte granularity). Accordingly, the data for any payload may be identified as ending at a particular "chunk" of data (e.g., a particular 4-byte chunk). As an example, if the width of the data signal D is 64 bytes, the number of potential data end positions is DE=64/4=16, with data_end[0] corresponding to data bytes [3:0], data_end[1] corresponding to data bytes[7:4], data_end[DE-1] for data bytes[D-1:D-4], and so on. The start of data signal (data_start) may utilize the same or a different granularity than the end of data signal. An instance of an SFI interface may be parameterized to support (and limit the number of payload starts according to) a maximum number of starts DS in a clock cycle. As an example, if the width of the data signal bus D is 64 bytes and the instance of the SFI interface is configured to limit the number of starts in a cycle to 2, DS=2, effectively dividing the data bus into two 32 byte chunks in which a new payload may begin being sent. For instance, in an example where D=62 and DS=2, data_start[0] would correspond to a chunk of data starting at data byte[0] and data_start[1] corresponding to a chunk of data starting at data byte[32], among other examples (including examples with lower or higher granularity in the start of data and end of data chunks (e.g., DS>2), smaller or larger data bus sizes, etc.).

In one example implementation of a DATA channel of an SFI interface, the width of the data start signal may be equal to DS and the signal may effectively act as a mask to identify each corresponding chunk of data on the data signal (e.g., aligned in the same clock cycle) that corresponds to the start of a respective payload. Further, each data start bit may have an associated data_info_byte signal sent with it that indicates metadata for the corresponding payload. In some implementations. the data_info_byte is sent only once for a given payload {e.g., with the corresponding data start chunk and data_start_bit), while in other instances the metadata may be sent (e.g., repeated} to correspond with every chunk of data in the same payload, among other example implementations. In one implementation, the data_info_byte signal may indicate the respective FC ID and the VC ID of the corresponding packet (e.g., with 4 bits (e.g., data_info_byte [3:0]) carrying the FC ID and another 4 bits (e.g., data_info_byte[7:4]) carrying the VC ID), among other example information for use by the receiver in processing the data payloads sent over the data signal bus.

Unlike the HDR channel, in some implementations of a DATA channel, data chunks from the same packet can be transferred over multiple cycles. For example, the raw data bus width could be implemented as 64B per cycle, allowing a 128B data packet to be transferred over 2 clock cycles. In some implementations, once a payload has begun transmission, the transmitter may guarantee that all the relevant data chunks in the payload are transferred consecutively from LSB to MSB and across successive clocks (e.g., without any gaps or bubbles). In some implementations, only one packet of a particular FC ID/VC ID combination may be sent on the interface at a time (with the FC ID/VC ID combination only reused after the preceding packet using the combination finishes sending). In some implementations, packets with different FC ID/VC ID combinations may be interleaved on an SFI interface (e.g., with a packet of one FC ID/VC ID combination being interrupted to send at least a portion of a packet with another FC ID/VC ID combination), among other examples.

The granularity of credits on the data channel may also be configurable (e.g., at design compile time) and may correspond to a multiple of N-bytes. For instance, in one example, the granularity may be required to be a multiple of 4 bytes. If the credit granularity is chosen to be 16 bytes, then even a 4-byte data packet transferred uses one 16-byte worth of credit, among other example implementations.

Figure 6:
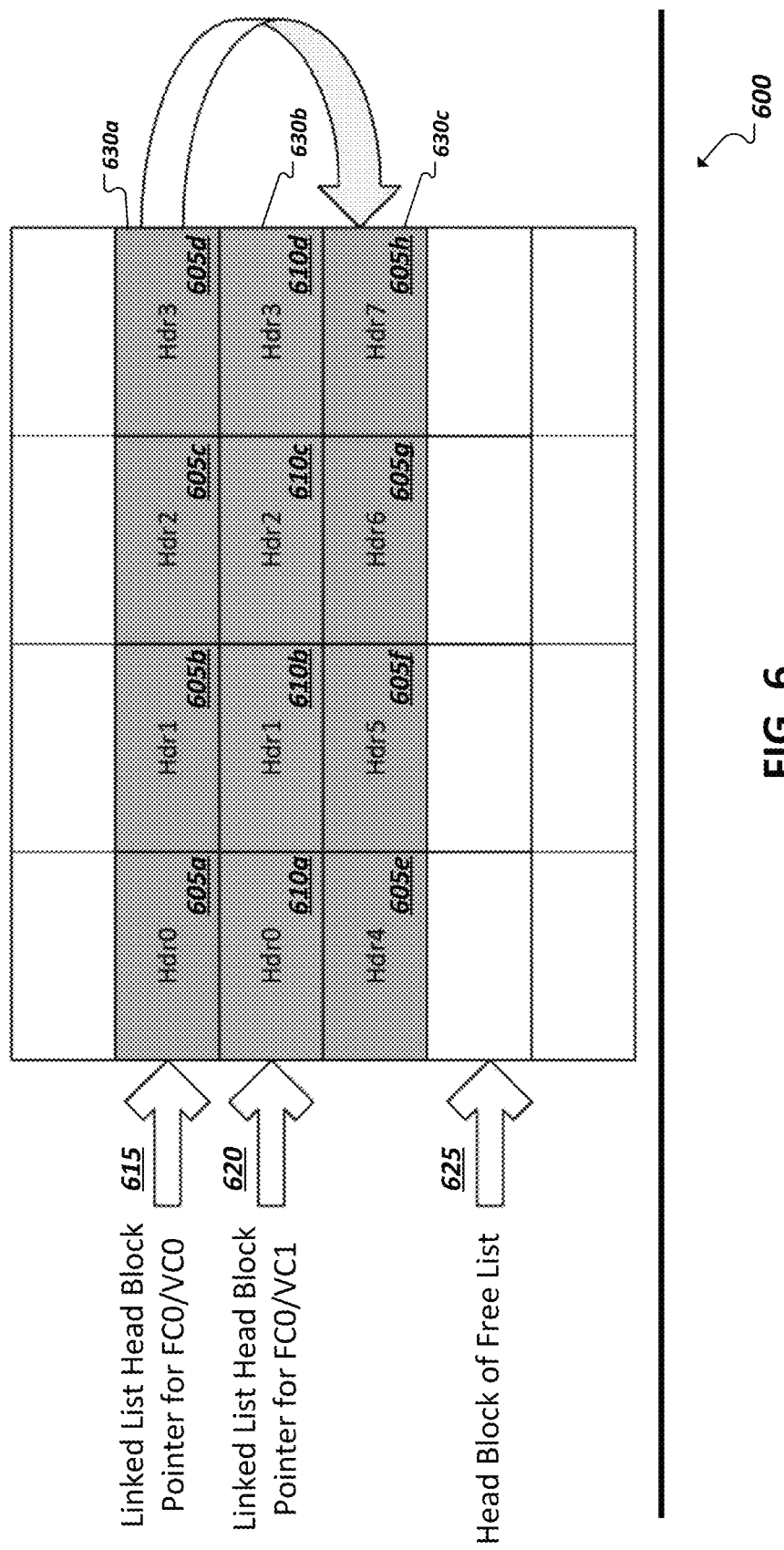
FIG. 6 is a simplified block diagram illustrating an example receiver buffer.

FIG. 6 is a simplified block diagram 600 illustrating an example implementation of a receiver buffer for use with an example SFI interface. In one example, the receiver buffer may be implemented as a linked list with a single write port and shared between two virtual channels (e.g., VC0 and VC1) of 1 flow control class (FC0). In this example, four headers per cycle can be received on the corresponding SFI interface. The linked list is managed in blocks (e.g., 630a-c) of four header locations at a time. While the linked list may appear to be logically in contiguous memory, physically blocks may be implemented non-contiguously or even in separate storage elements. In one example, all locations within a given block (e.g., 630a) are to be filled up before moving to the next block (e.g., 630b). The buffer is allocated by the receiver one block at a time, hence corresponding shared credits may also be at a block granularity. In implementations, where a set of 4 headers (e.g., 605a-d) in a block (e.g., 630a) is actually made of separate storage structures, each of these storage columns may be successfully implemented with only a single write port. For instance, each of the columns represented in the linked list buffer of FIG. 6 may be physically implemented as a distinct buffer/storage element with a respective single write port. Moreover, timing relief and pipelining potentials may be unlocked by using "block" management of linked list pointers (e.g., 615, 620, 625), since the next block pointer is only needed to be looked up once in 4 headers (in the example of FIG. 6). In some streaming protocols, the receiver cannot make the assumption of only one FC/VC combination per cycle in the general case, and therefore may be designed and equipped with multiple write ports (e.g., as the tails of different FC/VC can collide within the same storage column).

As discussed above, An SFI interface (and corresponding logic and buffers/trackers utilized by the transmitter and/or receiver to implement its half of the interface) may enable pipelining of header processing while data is streaming. Indeed, latency savings realized therethrough, in terms of header processing, directly translate to saved buffers in the receiver. In the context of Load/Store protocols, it is assumed that a receiver will separate the header and data internally anyway, as the headers are heavily consumed by the control path, whereas data for the most part is isolated to the data path. By splitting the header and data channels on an example SFI interface, headers of later requests may even bypass data of earlier requests and this can allow the receiver to start processing headers while data transfer is being completed. In the context of Host CPU processing inbound (device to host) writes, this may translate to a head start in obtaining ownership of the relevant cache lines, among other example use cases and advantages. Indeed, since fetching ownership is one of the most significant drivers of latency when processing writes, overlapping this while data streams can help reduce overall latency and buffers in the CPU. Deadlock is avoided by making sure that the transmitter checks for both header and data credits before sending either header or data.

In some implementations, each VC and FC defined for an SFI interface is to use a credit for sending any message and collect credit returns from the receiver. The source may consume the full credits required for a message to complete. Transmitters check for both HDR channel and DATA channel credits before sending corresponding messages on the respective channel to the receiver. The granularity of HDR and DATA channel credits are predetermined between the TX and RX. For instance, the granularity of credits on the data channel may be configured (e.g., at design compile time) to only be a multiple of N-bytes. For instance, in one example, the granularity may be required to be a multiple of 4 bytes. If the credit granularity is chosen to be 16 bytes, then even a 4-byte data packet transferred uses one 16-byte worth of credit, among other example implementations. In one example, FC IDs may be based on PCIe semantics (e.g., 4'h0=Posted, 4'h1=Non-Posted, 4'h2=Completions), among other example implementations. Further, each of the physical channels (e.g., DATA and HDR) may be outfitted with dedicated credit return wires (which, unlike the remaining channels flow from the receiver to the transmitter). For instance, during operation, the receiver returns credits whenever it has processed the message (or guaranteed a buffer position for the next transaction).

In some implementations, SFI allows two schemes for supporting sharing of buffers between different FC and VC IDs. In both the schemes, the receiver is to advertise the minimum number of dedicated resources needed for a forward progress guarantee. For large packet transfers, this means that the maximum payload size is based on the dedicated credit advertisement. If shared credits are used, the transmitter and receiver are to predetermine which of the credit types, or schemes, is to be used. This determination may be made at design time, in some implementations. In alternative implementations, the credit scheme may be dynamically determined (e.g., based on parameters written to corresponding configuration registers), among other examples.

A first one of the two schemes for credit sharing may be transmitter-managed. In this scheme, the transmitter is responsible for managing shared buffers in the receiver. One or more shared credit pools are advertised or consumed with spare VC ID/FC ID encodings. When the transmitter consumes the shared credit pool credit, it sends the packet using the corresponding VC ID/FC ID encoding. When the receiver deallocates a transaction that used the shared credit, it does a credit return on the corresponding VC/FC ID combination. In some implementations, a bit may be provided in the header (along with a corresponding signal on the HDR channel) to indicate whether the credit is a shared credit or not. Accordingly, the receiver may have to further decode the header packet to explicitly determine the real VC ID or FC ID of the packet, among other examples.

In one example implementation of transmitter-managed credit sharing, the mapping of example shared credit pools advertised by the receiver (e.g., in a PCIe-based implementation) may support two VCs on the link and adopt the following example mapping shown in Table 4:

TABLE 4

Example encodings for shared credits

| Encoding | Description |
| --- | --- |
| VC encoding 4'b0 | Maps to PCIe advertised VC0 on the link |
| VC encoding 4'b1 | Maps to PCIe advertised VC1 on the link |
| FC encoding 4'b0 | Posted (P) |
| FC encoding 4'b1 | Non-Posted (NP) |
| FC encoding 4'b2 | Completions (C) |
| VC encoding 4'b2; FC encoding 4'b0 | Shared credit pool 1, all VCs, P or C classes can use these shared credits |
| VC encoding 4'b2; FC encoding 4'b1 | Shared credit pool 2, all VCs, NP can use these shared credits |

The another one of the two credit-sharing schemes may be receiver-managed. In a receiver-managed scheme, the receiver is responsible for managing shared buffers. Only the dedicated credits are advertised to the transmitter. Typically, the advertised dedicated credits cover the point-to-point credit loop across the SFI, and the shared credits are used to cover the larger credit loops (e.g., the CPU fabric or Application Layer latencies). After a particular FC/VC ID transaction is received, and shared credits are available, a credit can be returned for that FC/VC ID combination (e.g., without waiting for the transaction to deallocate from the receiver queue). This implicitly gives a shared buffer spot for that FC/VC ID. Internally, the receiver tracks the credits returned to transmitter on a FC/VC basis and further tracks the credits currently consumed by transmitter. With this tracking, the receiver can ensure the maximum number of buffers used per FC/VC. The receiver may guarantee the required dedicated resources for forward progress guarantee, among other example implementations.

Error handling for illegal flow control cases may result in undefined behavior. Accordingly, SFI interface logic on the agents and fabric may check for illegal cases to trigger assertions in RTL and also log/signal fatal errors to allow for post-silicon debug. For instance, SFI may maintain consistency between the HDR and DATA streams, meaning that the transmitter is to send the data payloads in the same order it is sending the corresponding headers and vice versa. In some implementations, receiver logic may include functionality to detect and flag fatal errors for violations, among other example error handling features. In some implementations, SFI provisions for data poisoning to be sent at the end of a data transfer. In case of occasional errors, the ownership request could be discarded/written back without modification, or the host can choose to poison the relevant cache lines and write the updated data, among other examples.

Figure 7:
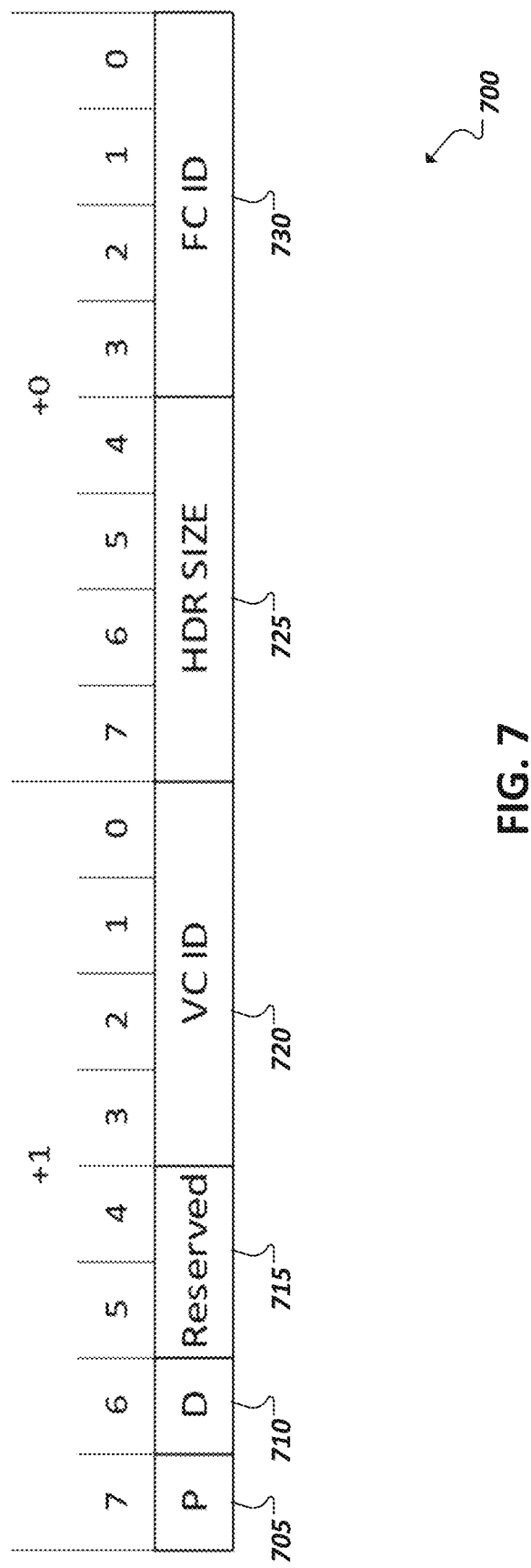
FIG. 7 is a representation of example fields in metadata for a header channel of a streaming fabric interface.

Turning to FIG. 7, a representation of an example metadata format 700 is shown that may be carried on the lanes of the header metadata signal. The least significant bytes and bits are shown to the right. P (705) is the Parity bit for a corresponding header. In some implementations, support for the parity bit may be optional (e.g., and the parity bit 705 treated as an additional reserved bit). When supported, parity may be supported, for instance, by XOR-ing at least all of the bits of a packet header. In some implementations, both the bits and the non-parity bits of the associated metadata 700 may be XOR-ed to determine the parity, among other examples. The bit D (710) indicates whether the header has corresponding payload data associated with it. All Reserved bits (e.g., 715) may be ignored the receiver or may be required to be driven to 0 by the transmitter. In some implementations, witches/fabric routers may be required to propagate the Reserved bits 715 as-is without any modifications. In some implementations, Reserved bits 715 may be utilized for vendor-defined encodings or future information, among other examples. The header size (HDR SIZE) 725 in the example metadata 700 may specify the size of the header (e.g., in 4-byte granularity). When computing the header size, the length of the header metadata (700) may be ignored (and not considered a part of the header).

In implementations of an SFI interface, a number of maximum packet headers that can be transmitted in 1 cycle on the interface may be predetermined (e.g., and recorded in a configurable parameter of the interface). The maximum packet headers per cycle may be determined by the width (or number of lanes) (H) of the header signal and the maximum packet header size. An SFI interface may be implemented (and designed) such that the header width (H) allow the common case usage to sustain maximum throughput. As an example, assuming the common case application header size is 16 bytes (e.g., mapping to 4 D-Word headers in PCIe), and that the interface is to sustain 2 headers per cycle, H=2* (16)=32 bytes. A corresponding valid signal (and lane) may be included in the HDR channel to correspond to the number of desired headers per cycle. As an example, if it is desired for the interface to sustain up to 2 headers per cycle, a corresponding M=2 number of valid lanes may be defined to support one valid signal for each of the potential 2 headers in a cycle (e.g., with hdr_valid[0] corresponding to a header starting in byte 0 of the header signal, and hdr_valid[1] corresponding to a header starting in byte 16 of the header signal. In some instances, one or more of the header formats of a supported protocol may be too large to be sent in only one of the subsets of lanes defined in the header signal (and assigned to a respective one of the valid signal lanes), meaning that such headers may utilize two or more of the subsets of lanes in the header signal for transmissions (and only a first (least significant bit) one of the two or more associated valid signals may be asserted). In such instances, when the maximum headers per cycle is set to 2, if a larger header format is to be sent on the header signal, only 1 header can be transferred in that cycle and hdr_valid[1] is not asserted, among other examples.

Continuing with the example of FIG. 7, header metadata may additional include information for use in flow control for the header (and related packet). For instance, metadata may include a virtual channel (VC) identifier (ID) 720 for the header and a flow control class (FC) ID 730 for the header. In some instances, packet ordering may be according to the VC ID and FC ID (e.g., the combination of the VC ID and FC ID) of the packet. In some implementations, parameters of an SFI interface may be configured to set, for the interface, a predetermined number of maximum FC and VC ID combinations may that are allowed to be used in any given transfer cycle (e.g., clock cycle) of the interface. This maximum number of FC-VC combinations may be advertised or otherwise set at both the transmitter and receiver interface logic (e.g., at design compile time). This maximum value may be set, for instance, to assist in minimizing the write ports in the storage of receivers when the receiver buffers are shared between supported FCs and/or VCs. As an example, an interface may be parameterized to accept a maximum of two different FC-VC combinations in a cycle, such that on any given cycle all the packet headers transferred belong to at most two different FCs within the same VC, the same FC but for two different VCs, or the same FC-VC combination.

Transmitters may utilize credits associated with FCs, VCs, or FC-VC combinations to determine whether a packet may be sent over the channel. For instance, if a packet header has data associated with it, the packet header is sent on the HDR channel and the associated data is sent on the DATA channel. Prior to sending the header or payload data, the transmitter may check (e.g., a tracking record in local memory) for available credits for both headers and payload data (and the corresponding HDR and DATA channels) before scheduling the header or payload data transfer. In some implementations, the credit granularity for the Header channel may be set to the maximum supported header size. For example, if the maximum header size supported is 20 bytes, then 1 credit on the Header channel may correspond to 20 bytes worth of storage at the receiver. In some instances, even if only a 16-byte header is to be sent, 1 full credit is consumed corresponding to the full 20 bytes, among other examples and similar alternative flow control and crediting implementations.

Figure 8:
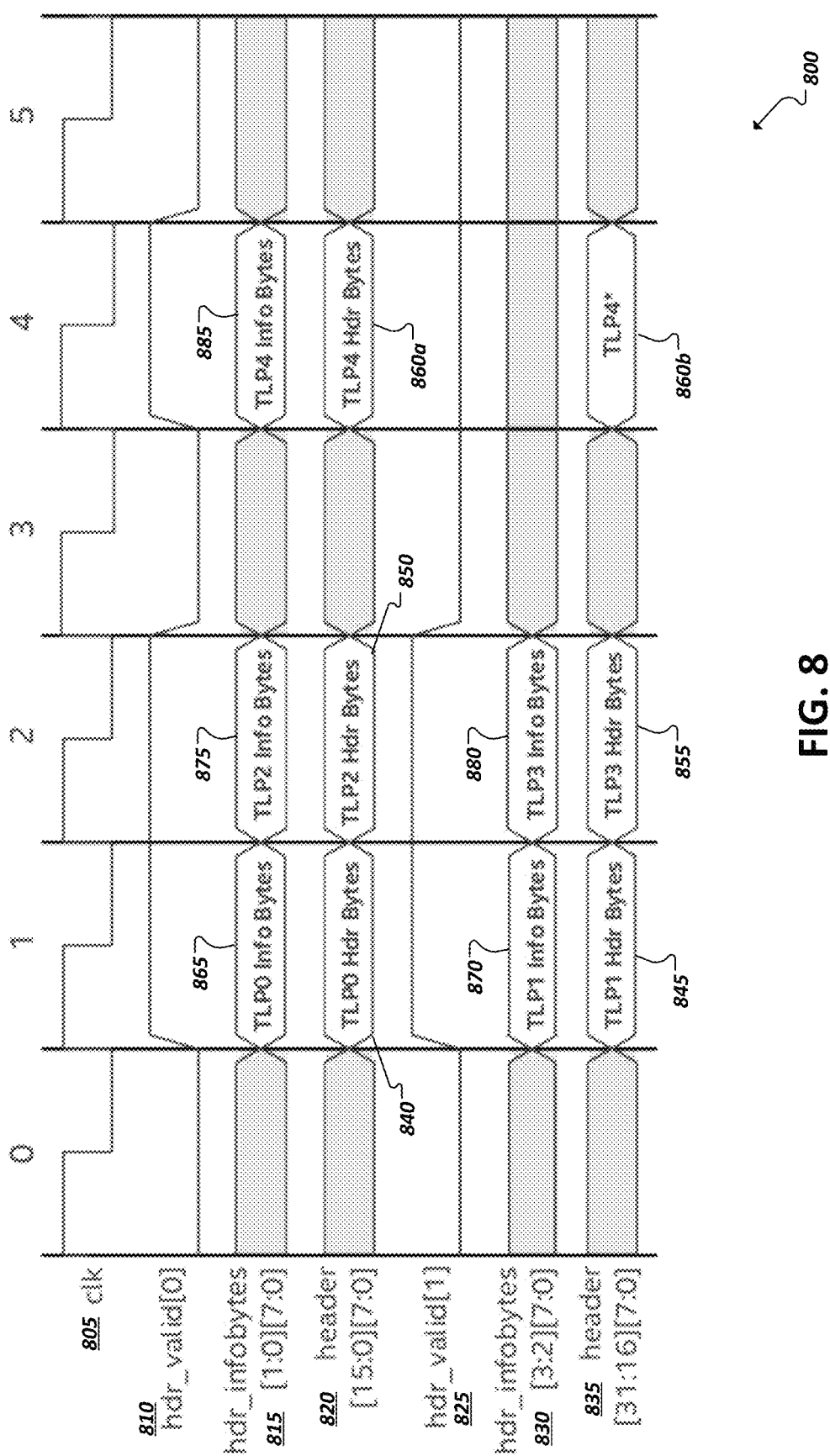
FIG. 8 is a timing diagram illustrating example data flow on a header channel of an example streaming fabric interface.

Turning to FIG. 8, a simplified timing diagram 800 is shown to illustrate an example of header transfers using a header channel of an example SFI interface. The header channel may include a clock lane, one or more lanes dedicated to header valid signals (e.g., 810, 825), lanes dedicated to communicating header metadata (e.g., 815, 830), and lanes dedicated to implementing multiple bytes of a header bus (e.g., 820, 835). In the example of FIG. 8, multiple valid signals are provided to govern the sending of valid header data on corresponding subsections of the header bus. For instance, header lane 810 may carry valid signals corresponding to the lanes (e.g., 820) implementing bytes 0-15 of the header bus and header lane 825 may carry valid signals corresponding to the lanes (e.g., 835) implementing bytes 16-31 of the header bus. Accordingly, valid signal 810 may be asserted as long as valid data is being sent on bytes 0-15 of the header bus (e.g., as in clock cycles 1, 2, and 4), and likewise, valid signal 825 may be asserted to correspond with valid data sent on bytes 16-31. In one example, as in FIG. 8, the corresponding header data may be sent in alignment (e.g., the same clock cycle) as the corresponding asserted valid signal, while in alternative implementations, a delay may be defined between the assertion of a valid signal and the sending of header data, among other example features and implementations.

Continuing with the example of FIG. 8, the subsections of lanes implementing the header bus may also be associated with respective header metadata (or hdr_info) signals (e.g., 815, 830). For instance, header bytes 0-15 (e.g., 820) may be associated with a first header metadata signal 815 and header bytes 16-31 may be associated with a second header metadata signal 830. The header metadata signal may carry data (e.g., 8 bytes) per cycle that describes attributes of the header carried on corresponding header bus lanes. In some cases, both subsection of the header bus may be utilized to carry a larger header, resulting in fewer than the maximum number of headers-per-cycle being transmitted in a given cycle (e.g., clock cycle 4). When two or more subsections of the header bus are used to transmit a single header, in some implementations, only one of the corresponding metadata signals (e.g., the signal corresponding to the least significant bytes of the header) may carry data, while the remaining metadata signals do not carry any metadata. In this manner, a receiver may identify that more than one subset of header bus lanes is being used to transmit a single header, among other examples (e.g., the assertion of one or both of the valid signals (e.g., 810, 825) corresponding to the subsections of the header bus used to communicate the header).

In the particular, simplified example of FIG. 8, the headers of five transaction layer packets (TLPs) are shown being transmitted over an example SFI header channel. For instance, header bus subsections 820, 835 may each carry headers of two distinct TLPs in clock cycles 1 and 2 (e.g., the headers of TLP0 (840) and TLP1 (845) is cycle 1, and the headers of TLP2 (850) and TLP3 (855) in cycle 2). This may be possible based on the header sizes of these respective packets. Further, corresponding header metadata (e.g., 865, 870, 875, 880) may be transmitted on the corresponding header metadata signals 815, 830 in cycles 1 and 2. The valid signals 810, 825 may be de-asserted in cycle 3, causing no additional header data to be transmitted during this cycle.

In cycle 4, the header of another TLP, TLP4, is to be transmitted. In this example, the size of the header of TLP4 requires transport over both of the header bus subsections 820, 835 in order to communicate the header over the HDR channel in a single clock cycle. For instance, the headers (e.g., 840, 845, 850, 855) of TLPs 0-3 may have been of size HDR SIZE=4, while the size of the TLP4 header is HDR SIZE=5. Accordingly, in this example, the bytes of the TLP4 header (860a-b) are transmitted on the lanes of both header bus subsections 820 and 835. In this example, only the valid signal 810 corresponding to the subsection (or bytes) of the header bus carrying the beginning of the header (or the least significant bytes) is asserted high (at 890), while the other valid signal 825 remains deasserted in clock cycle 4. Similarly, only one of the header metadata signals (e.g., 815) may be used to carry the metadata information for the TLP4 header, with the metadata signal (e.g., 830) corresponding to the most significant bytes of the header carrying a null or other signal. In one example, the headers of TLPs0-4 may be according to a PCIe-based protocol. In such instances, The TLP Hdr bytes follow the format described in the PCI Express Base Specification. In this example, hdr_start[0] is associated with header byte[0] and hdr_start[1] is always associated with header byte[16], among other example implementations.

In some implementations, an SFI interface may be implemented as a synchronous interface, where both sides of the interface run on the same clock. This notwithstanding, transmitters and receivers may not be required to coordinate resets at each respective device. Instead, in some implementations, an initialization flow defined for the interface may define a separate handshake to ensure transmitter and receiver exchange information about interface reset and flow control before traffic begins on the interface.

Figure 9:
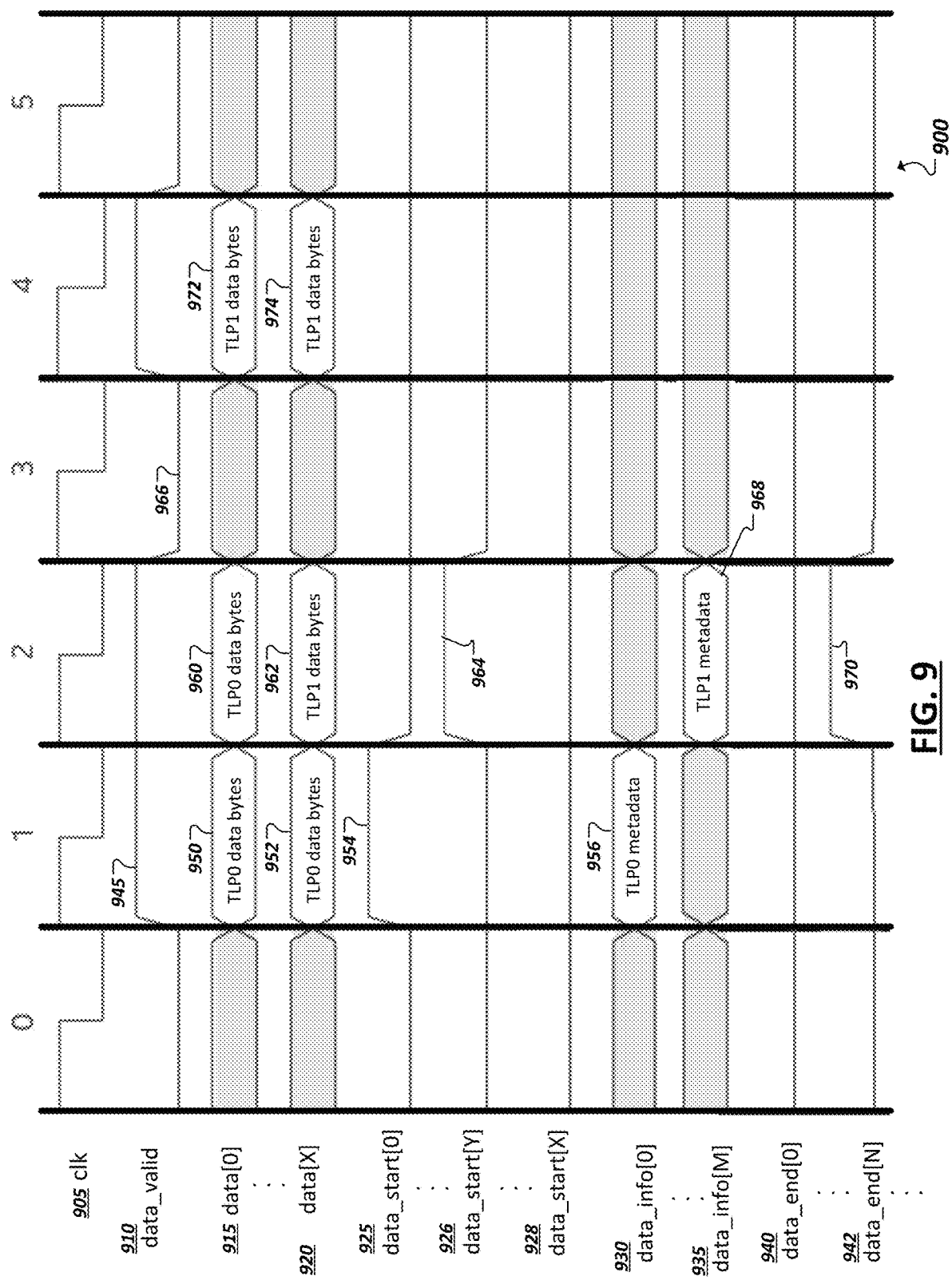
FIG. 9 is a timing diagram illustrating example data flow on a data channel of an example streaming fabric interface.

Turning to FIG. 9, a simplified timing diagram 900 is shown to illustrate an example of data transfers using a data channel of an example SFI interface. In this example, the DATA channel includes a clock 905, a single valid signal 910 (e.g., on a single lane of the channel) and sets of lanes (e.g., 915, 920) implementing one or multiple subsections of the data bus. In the particular illustrative example of FIG. 9, X-1 subsections are illustrated. When the valid signal 910 is asserted (e.g., at 945), data appearing on the data bus (and supporting signals (e.g., 925, 930, 935, 940) are considered valid. When valid 910 is deasserted (e.g., at 966), transmission of data on the data bus is to pause or stall until valid is reasserted.

In some implementations of an SFI DATA channel, a start of data (or data_start) signal may be provided, which is implemented on a set of lanes to implement a corresponding number of bits of the data_start signal. For instance, the data_start signal may be implemented as a bit vector with a corresponding data_start lane (e.g., 925, 926, 928, etc.) being mapped to a respective byte or span of bytes in the data bus. For instance, each data_start lane (e.g., 925, 926, 928, etc.) may map to a corresponding one of the X+1 subsections of the data bus. For instance, in an example where there 8 subsections of the data bus, the start of data signal may be composed of 8 bits or lanes, with each bit mapped to one of the subsections. When a first byte (e.g., as measured from the least significant byte to the most significant byte) of a payload is communicated in a particular clock cycle, the corresponding start of data signal (e.g., 925) may asserted (e.g., at 954) identify the subsection (or chunk) of the data bus in which that first payload byte can be found. Through this, a receiver may identify a boundary between two payloads communicated on the channel.

As in the example of an HDR channel, an SFI DATA channel may also carry metadata on dedicated metadata (data_info) signal lanes (e.g., 930, 935) to describe corresponding payload data sent on the data bus. In some implementations, metadata for a payload may be communicated on the DATA channel in association with the start of that payload (e.g., aligned with the first byte of the payload and the corresponding data_start signal). Indeed, multiple metadata signals may be defined and carried on the DATA channel, one corresponding to each of a corresponding number of subsections of the data bus (e.g., 915, 920). The subsections or chunks, in some implementations, may correspond to the same logical chunks utilized in the data_start signal (and/or the data_end signal 940). For instance, when a particular chunk carries the first bytes of a new payload, a corresponding one of the metadata signals (e.g., 930, 935) is responsible for carrying the corresponding metadata for that payload. As an example, as shown in FIG. 9, in clock cycle 1, the start of the payload (950) of TLP0 may begin on a first subsection (e.g., 915) of the data bus. Accordingly, the data_start signal 925 may indicate (at 954) that the subsection (e.g., corresponding to Byte 0 of the data bus) carries the start of a new payload. Other subsections (e.g., 920) of the data bus may be used to communicate additional other chunks (e.g., 952) of the same payload. Additionally, one of the metadata signals (e.g., 930) corresponding to the first subsection (e.g., 915) of the data bus, may be encoded with the metadata (e.g., 956) for the TLP0 payload.

Continuing with the example of FIG. 9, payload data (e.g., 950, 952, 960) of TLP0 may continue to be sent over multiple clock cycles on the data bus until it has all been sent. The end of data (or data_end) signal 940 may operate in a manner similar to the start of data signal with a number of lanes (e.g., 940, 942) mapped to identify a subsection of the data bus in which a final chunk of payload data has been sent within a corresponding clock cycle. The granularity of the subsections or chunks referenced by the data_end signal may be higher or lower than or the same as that used in the data_start and metadata signals. In one example, the subsections or chunks referenced by the data_end signal 940 may be 4 bytes, among other examples. In the particular illustrative example of FIG. 9, the final bytes/bits of the payload of TLP0 are to be sent in a subsection "N" of the data bus bytes and lanes, as measured according to the granularity configured for the data_end signal. Accordingly, the lane (e.g., 940) of the data_end signal mapped to subsection N may be asserted to identify that subsection N carries the end of the payload. In some implementations, the granularity of the data bus subsections and chunks used by the start of data, end of data, and metadata signals may be configured through corresponding parameters set for the SFI interface, among other examples.

Continuing with the example of FIG. 9, a second payload of a second packet (e.g., TLP1) may be sent on the data bus (e.g., the start of the second packet being sent in a data chunk/subsection "Y"). In some implementations, payloads of multiple packets may be sent concurrently on the data bus (e.g., using respective subsections of the data bus). In this example, the payload of TLP0 ends and payload of TLP1 begins in clock cycle 2. Accordingly, both a data end signal (e.g., 970) and a data_start signal (e.g., 964) are sent in the same cycle, with the data_start signal 964 indicating the subsection or chunk (e.g., subsection "Y", where 0<Y<X) of the data bus in which the start of the payload appears. In the example of FIG. 9, the start of data signal may be at a 1-byte granularity and specifically identify the byte in the data bus where the payload begins (e.g., Byte 0 for the payload of TLP0, Byte Y for the payload of TLP1, etc.). Accordingly, the width of the data start and data end signals may be based on the respective granularity used. Further, in the example of FIG. 9, the payload of TLP1 begins being sent in clock cycle 2, but the transmission may be temporarily interrupted through the de-assertion of valid signal 910 (at 966), with the remaining bytes (e.g., 972, 974) sent when the valid 910 is reasserted. In other examples, valid may be required to remain asserted until all bytes of an in-transit payload have been sent, among other example implementations. It should be appreciated that the examples of FIGS. 8 and 9 are simplified, non-limiting examples provided for the sake of illustrating more general principles (and alternative implementations) that may be implemented in example SFI HDR and DATA channels, among other examples.

In some implementations, a state machine or other logic may be provided on agent and fabric devices to participate in defined connect and disconnect flows for an SFI interface. For instance, such flows may be invoked during boot/reset and when going into a low power mode, among other example states or events. In some implementations, SFI defines an initialization phase where information about credit availability in the receiver (RX) is communicated to the transmitter (TX) after a connection is established. In some instances, reset can independently de-assert between the agent and fabric sides of SFI. For independent reset, the initialization signals may be driven (e.g., on the Global channel) to the disconnected condition when in reset and no traffic may be sent until initialization reaches the connected state. The disconnect flow may be additionally supported by agents, for instance, to reconfigure credits and achieve power saving. Without this flow, all SFI credits may be configured to a final value before the first connection can proceed.

In initializations, the transmitter and receiver sides (e.g., the agent and fabric sides) of an SFI interface may be brought out of reset close to or at the same time. One end of the interface (e.g., after coming out of reset) may not have implicit requirements for when the other end should come out of reset. In some implementations, SFI may define an explicit handshake during initialization between the agent and fabric to ensures that both endpoints (and all pipeline stages between them) are out of reset before any credits or transactions are sent on the UFI interface. Accordingly, after reset, the receiver may begin sending credits for use by the transmitter.

Figure 10:
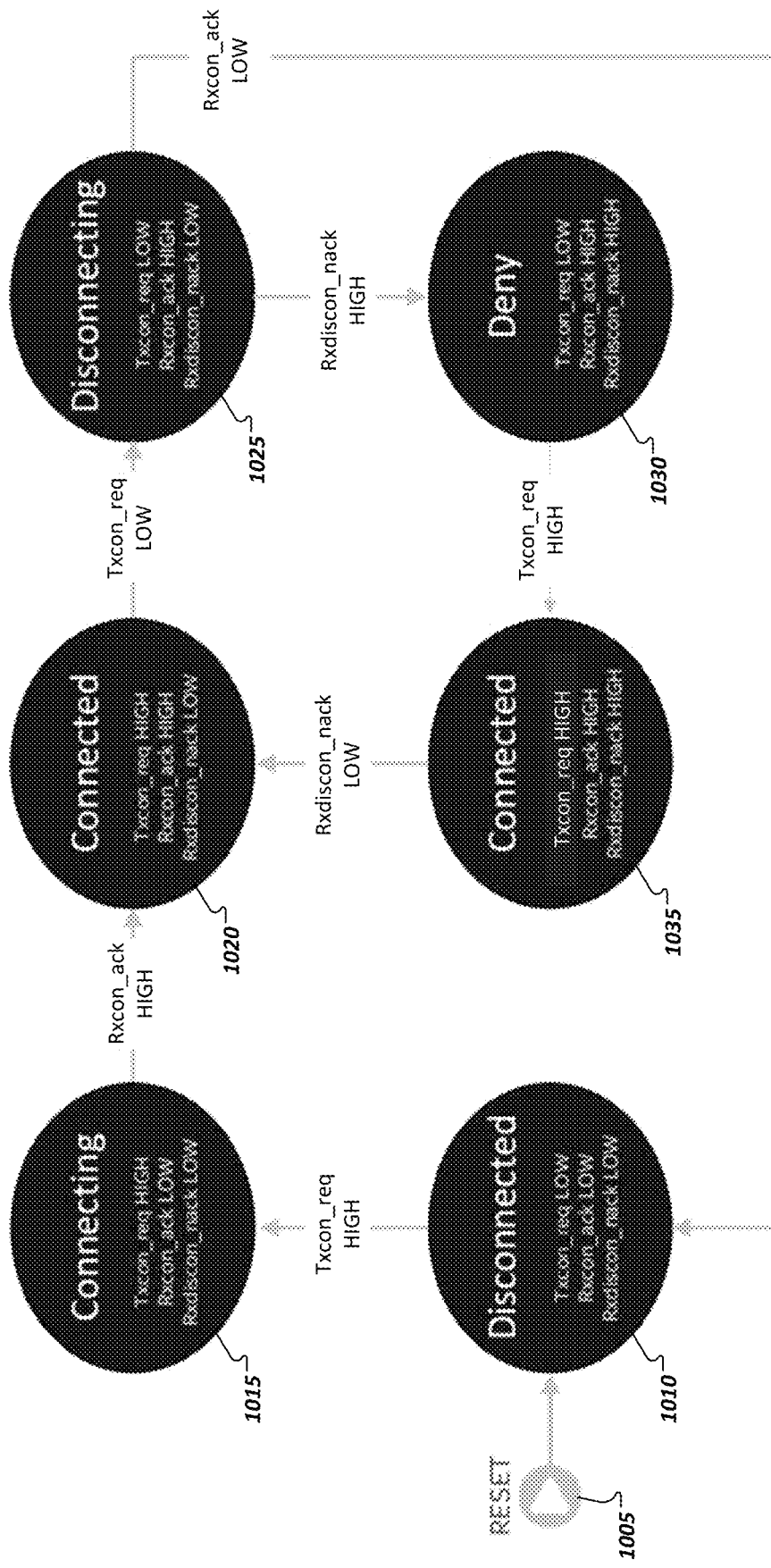
FIG. 10 is a diagram illustrating an example initialization state machine for an example flexible on-die fabric interface.

FIG. 10 is a diagram 1000 illustrating an example state machine for initialization states in an example implementation of an SFI interface. States may include a Disconnected state 1010 (which may be entered based on a reset 1005), a Connecting state 1015, a Connected state (1020, 1035), a Disconnecting state 1025, and a Deny state 1030. The combinations of values of the txcon_req signal, rxcon ack signal, and rxdiscon_nack signals may indicate a respective initialization state. As an example, in the Disconnecting state 1025, the txcon_req signal may be LOW, the rxcon ack signal may be HIGH, and the rxdiscon_nack may be LOW. Changing a particular one of the signal values may cause a transition from one initialization state to another. For instance, wherein the Disconnecting state 1025, changing the rxcon ack signal from HIGH to LOW may cause a transition to the Disconnected state 1010, while changing the rxdiscon_nack signal from LOW to HIGH may cause a transition to the Deny state 1030, among other example as illustrated in the state machine example of FIG. 10. In a UFI interface, respective initialization states are used to determine actions to be performed by the receiver and transmitter, such as the example actions described in Table 5 below.

TABLE 5

| Initialization State Actions | | | | | |
|---|---|---|---|---|---|
| txcon_req | rxcon ack | rxdiscon_nack | State | Tx Actions | Rx Actions |
| 1 | 0 | 0 | Connection request (Connecting) | Sink Credits Do NOT Send Packets | |

TABLE 5-continued

Initialization State Actions

| txcon_req | rxcon ack | rxdiscon_nack | State | Tx Actions | Rx Actions |
|---|---|---|---|---|---|
| 1 | 1 | 0/1 | Connected | Sink Credits<br>Send Packets | Send Credits<br>Sink Packets |
| 0 | 1 | 0 | Disconnection request (Disconnecting) | Sink Credits<br>Do NOT Send Packets | |
| 0 | 1 | 1 | Deny (Disconnect Rejected) and must go back to connected | | |
| 0 | 0 | 0 | Disconnected | Drop Credits<br>Do NOT Send Packets | Do NOT Send Credits<br>Do NOT Sink Packets |
| 1/0 | 0 | 1 | Illegal States | n/a | n/a |

Signaling rules may be defined for a Global initialization signal set. In one example, the txcon_req signal may be defined such that a transition from 0 to 1 reflects a connection request and a transition from 1 to 0 reflects a disconnection request. Credit return signals may be provided, for instance, with a credit valid (crd_valid) signal and a credit shared (crd_shared) signal. In one example, crd_valid=1 may be defined to mean it is releasing the dedicated message credits for a protocol ID and a virtual channel ID, while crd_shared=1 means it is releasing a shared credit (which can happen in parallel with a dedicated message credit return). In some implementations, a credit return behaves in the same way during the first initialization of credits as it does during runtime return of credits. The rx_empty signal indicates all channel credits returned from the receiver and all receiver queues are empty (although this may not account for messages that are in flight or in intermediate buffers such as clock crossing queues, among other example issues). In some implementations, a transmitter may check rx_empty before initiating a disconnect. By checking, it increases the probability that the disconnect is quickly accepted (e.g., in absence of possible in-flight requests that have not yet registered in at the receiver). In some implementations, to further increase the probability of disconnect acceptance, the transmitter may implement a timer delay after the last valid message sent such that the receiver pipeline would have time to drain into the receiver queues, among other example features. In some implementations, during initialization, the transmitter sends messages as soon as any credits are available and not depend on a rx_empty assertion. Alternatively, a transmitter may stall the sending of any packets after initialization until rx_empty is asserted, the transmitter can use the credits received as an indication of the total credits a receiver has advertised. In an example implementation of an SFI interface, a transmitter can send packets when it receives sufficient credits from the receiver. The transmitter may identify the packet is to be transmitted and determine that there are respectively sufficient HDR and Data credits for the packet before the transmission begins.

As further examples of signaling rules, which may be defined in a UFI implementations, connection ACKs may be defined to always follows connection requests. As noted above, a connection request may be signaled by txcon_req transitioning from 0→1. This transition serves as an indication that the transmitter Tx is ready to receive credits and is in normal operation. An ACK may be signaled by rxcon ack transitioning from 0→1. An ACK may be stalled for an arbitrary time until a receiver is ready to complete. Similarly, disconnect ACKs or NACKs may be defined to follow disconnect requests. A disconnect request may be is signaled by a txcon_req transition from 1→0. A disconnect ACK may be signaled by an rxcon_ack transition from 1→0. A disconnect NACK may be signaled by an rxdiscon_nack transitioning from 0→1. A rule may be defined to require a receiver to either respond with an ACK or NACK to each disconnect request it receives, among other example policies and implementations.

Figure 11:
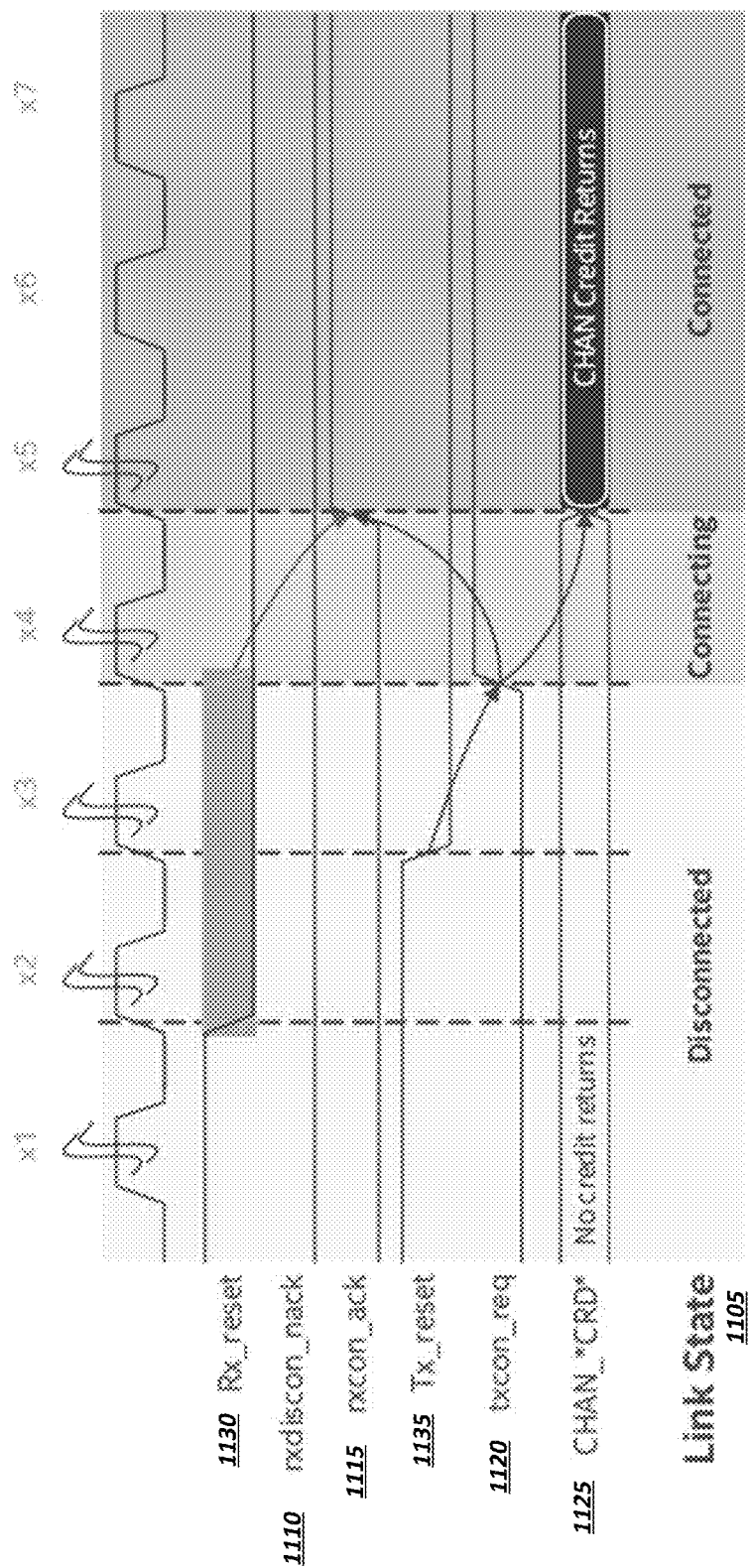
FIG. 11 is a timing diagram illustrating initialization of an example flexible on-die fabric interface.

Turning to FIG. 11, an example timing diagram 1100 is illustrated for initialization of an SFI interface from a Reset to a Connected state. In the particular example illustrated in FIG. 11, an example initialization flow is illustrated utilizing initialization signals in a Global channel of the SFI interface. As shown in FIG. 11, the initialization signal set may include a receiver disconnection NACK signal 1110, a receiver connection ACK signal 1115, and a transmitter connection request signal 1120. Additional signals are shown to illustrate certain features, including a receiver reset signal 1130 (to cause the agent to enter a reset condition), a transmitter reset signal 1135 (to cause the fabric to enter a reset condition). Also illustrated is a representation of at least one of the SFI channels' credit return signal set 1125 (e.g., the credits signal set for one or more of the HDR and DATA channels).

To enter a connected state, once the transmitter is out of reset, it may assert the txcon_req signal 1120 to identify the request to the receiver. Similarly, when the receiver is out of reset, it waits for a connection request on the txcon_req signal 1120. The assertion of the connection request can be an arbitrary number of cycles after the reset (e.g., 1130) asserts. Until the connection is complete, the txcon_req signal 1120 is to remain asserted and is to only de-assert as part of the disconnect flow. Upon receiving a connection request on the txcon_req signal 1120, the receiver may assert the rxcon ack signal 1115 to acknowledge the request. The rxcon_ack signal 1115 may be asserted after the resets of receiver and transmitter and the assertion of the txcon_req signal 1120. The rxcon_ack signal 1115 is to remain asserted and is to be first deasserted only in a disconnect flow.

This sequence may allow the initialization link state 1105 to progress from a Disconnected to a Connecting to the Connected state. Upon entering the Connected state (and sending the rxcon_ack signal) the receiver may immediately begin returning credits (e.g., on credit return wires 1125. Indeed, the receiver may start to return credits simultaneously with the assertion of rxcon_ack signal 1115. Accordingly, the transmitter (e.g., the agent) is prepared to accept credit returns upon asserting the txcon_req signal 1120 (e.g., at clock cycle x4), for instance, because credit returns might be observed before observation of A2F_rxcon_ack due to intermediate buffering or clock crossings. After the minimum credits are received to send packets, the transmitter can start sending packets or messages over the channel. The reconnect flow may be implemented similar to the connect from reset flow discussed herein, however, to start a new credit initialization, the receiver will first reset its credit counters to reset values and the transmitter is to reset its credits available counters to zero, among other example implementations.

Figure 12:
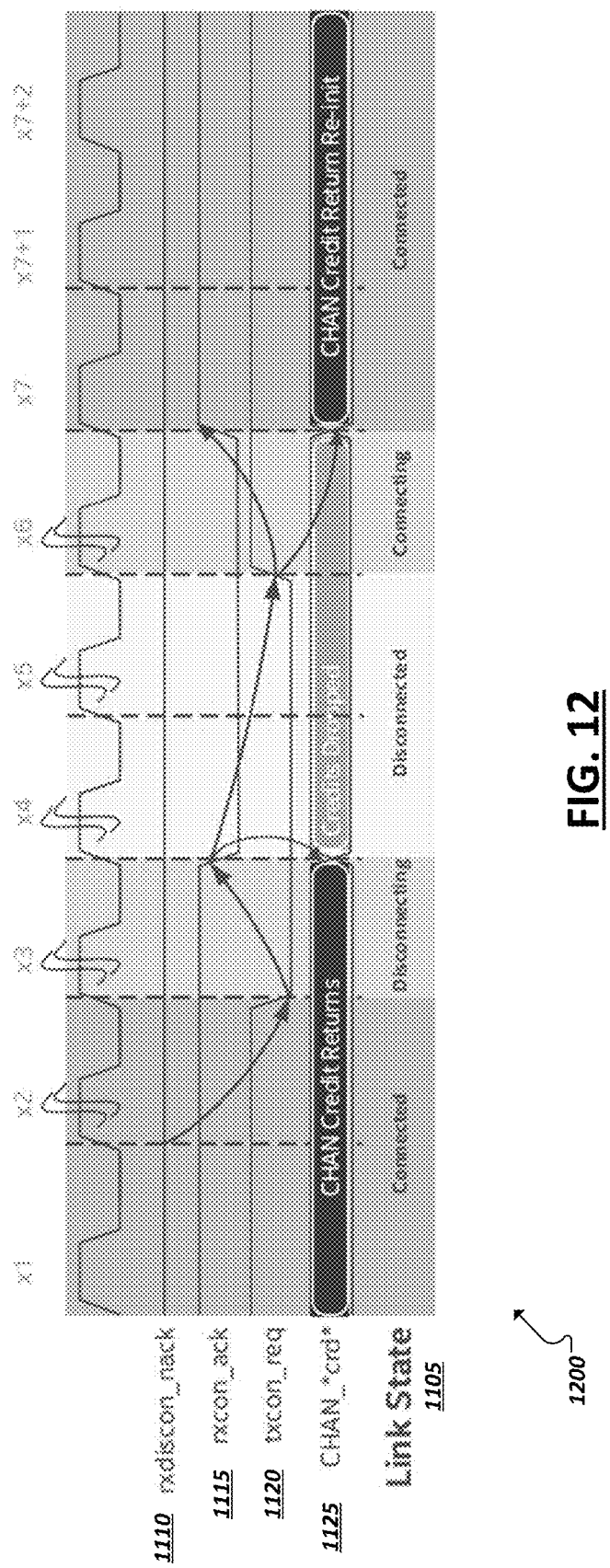
FIG. 12 is a timing diagram illustrating a first example of a disconnect flow in an example flexible on-die fabric interface.

Turning to FIG. 12, an example timing diagram 1200 is shown illustrating an example disconnect and reconnect flow for an example SFI interface. In this example, the transmitter may de-assert the txcon_req signal 1120 to facilitate a disconnect at time x3. In some implementations, to allow the disconnect to progress, the rxdiscon_nack signal 1110 is to be de-asserted before txcon_req signal 1120 is de-asserted. When a disconnect is requested, the transmitter is to no longer be sending messages on any channel (e.g., indicated by CHAN_is_valid bit assertion). Based on the initiation of a disconnect flow by the transmitter, the receiver is to decide whether to acknowledge (ACK) or negatively acknowledge (NACK or reject) the disconnect. To acknowledge the disconnect, the receiver may de-asserts the rxcon_ack signal 1115 after ensuring all pipelines are empty (e.g., at clock cycle x4), which marks the entry into a disconnected state (as reflected by link state indicator 1105). In some instances, the receiver may can also ensure that all credits have been returned.

Figure 13:
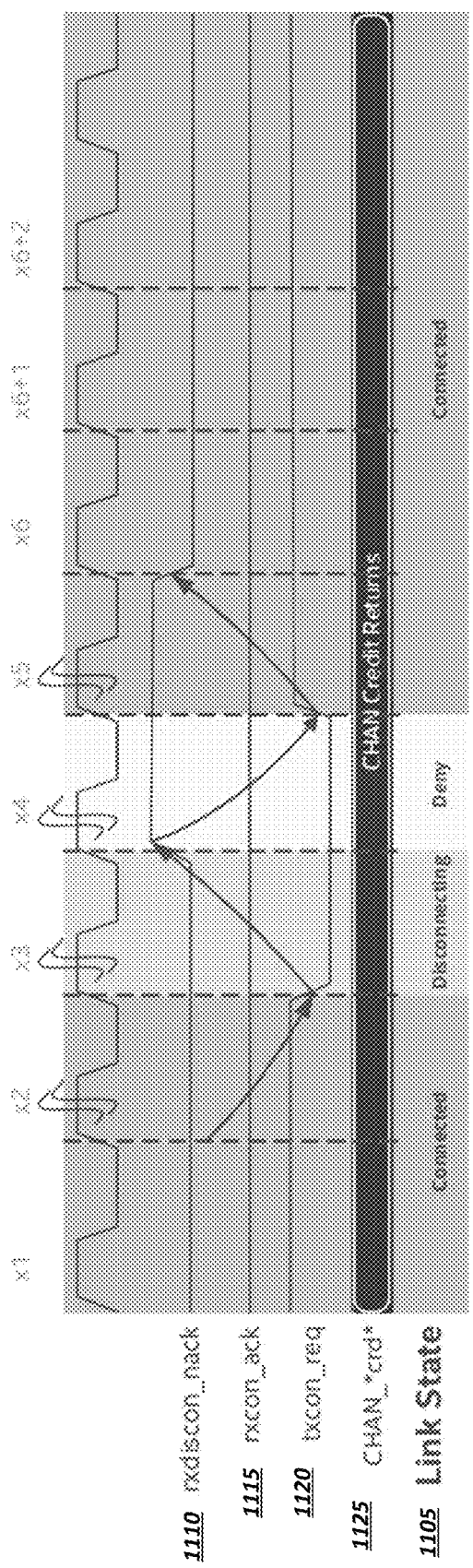
FIG. 13 is a timing diagram illustrating a second example of a disconnect flow in an example flexible on-die fabric interface.

While the diagram 1200 of FIG. 12 illustrates an instance where a disconnect request was positively acknowledged by the receiver, FIG. 13 illustrates a contrary example where the receiver responds with a negative acknowledgement (or NACK). For instance, to send a negative acknowledgment, the receiver may instead assert the rxdiscon_nack signal 1110 (e.g., at clock cycle x4). For instance, the negative acknowledgement may be selected if the receiver determines that it is unable to drain its pipelines without risking deadlock, among other example reasons. After the NACK, the transmitter is to reassert the txcon_req signal 1120 (e.g., at clock cycle x6). Upon observance of this effective acknowledgment by the transmitter of the receiver's NACK, the rxdiscon_nack signal 1110 can be de-asserted (e.g., as shown at clock cycle x6 in the example of FIG. 13).

In some implementations, the connect and disconnect flows are expected to complete within a few microseconds after initiation. In some implementations, a timeout may be defined, explicitly or implicitly. For instance, a receiver may be configured to reply with an ACK or NACK within a defined or recommended window of time. For instance, the agent, fabric, or system (e.g., SoC) can define a timeout or time window to enforce this expectation.

In some instances, an agent or fabric element may reset while the SFI interface is in a connected state, resulting in a surprise reset. For instance, the defined or recommended flow may be to enter Disconnect before Reset. As one example, a rxcon_ack signal may transition 1→0 occurs because of a surprise reset on receiver side of the link while value of the transmitter's txcon_req signal is 1. In such a case, the transmitter may force itself to a disconnected state and restart initialization. If this happens when the transmitter is in an idle state, it can recover without loss of messages. As another example of a surprise reset, if the txcon_req signal transitions 1→0 because of a surprise reset on the transmitter side of the link while the rxcon_ack is 1, the standard disconnect flow may be followed. If this happens when receiver is in an idle state, disconnect should receive Ack and cleanly reach a disconnected state provided transmitter stays in reset. If the disconnect is Denied (NACK) by the receiver, however, a fatal or illegal link state may result (e.g., an unrecoverable error). In cases of surprise resets, if traffic is active (e.g., not idle), a loss of protocol messages can result and may be fatal to continued normal operation.

As discussed above, an SFI interface in a system may be configurable according to a variety of parameters. For instance, a set of parameters may be specifically defined in accordance with the use case, features, protocols, and topology of a given system, such as a particular SoC design. Such parameters may define, for instance, the maximum number of headers that can be transmitted in a single cycle, the maximum header size, the maximum number of payloads of different packets that may be sent in a single cycle, among other example parameters. Parameters values may be defined and saved, for instance, in a configuration register or other data structure for use and reference by the agent and fabric components connected through the interface. Table 6 presents an example of parameters, which may be set in one example of an SFI interface.

TABLE 6

Parameters Supported

| Parameter | Description |
| --- | --- |
| VT | Width of tx_vendor_field |
| VR | Width of rx_vendor_field |
| M | Maximum number of Headers that can be transmitted on a given cycle |
| MAX_HDR_WIDTH | Maximum size of 1 header in bytes. One header credit corresponds to MAX_HDR_WIDTH bytes of storage. A minimum and maximum of one credit is used per header transfer. |
| H | Total width of header in bytes. It is MAX_HDR_WIDTH*M. |
| MAX_FC_VC | Maximum number of FC and VC ID combinations that can be received in 1 cycle. It is recommended that this be 1. This parameter applies to both HDR and DATA Layers. |
| D | Total width of the data signal in bytes. This must be a multiple of 4. |
| DS | Maximum number of independent data packets that can be sent in 1 cycle. |
| DATA_PASS_HDR | If set to 1, TX can allow Data to race ahead of the corresponding Header. If set to 0, TX will always send Header before the corresponding Data. It is recommended that this parameter be set to 0, so that the RX data tracking is simplified. |

Figure 14:
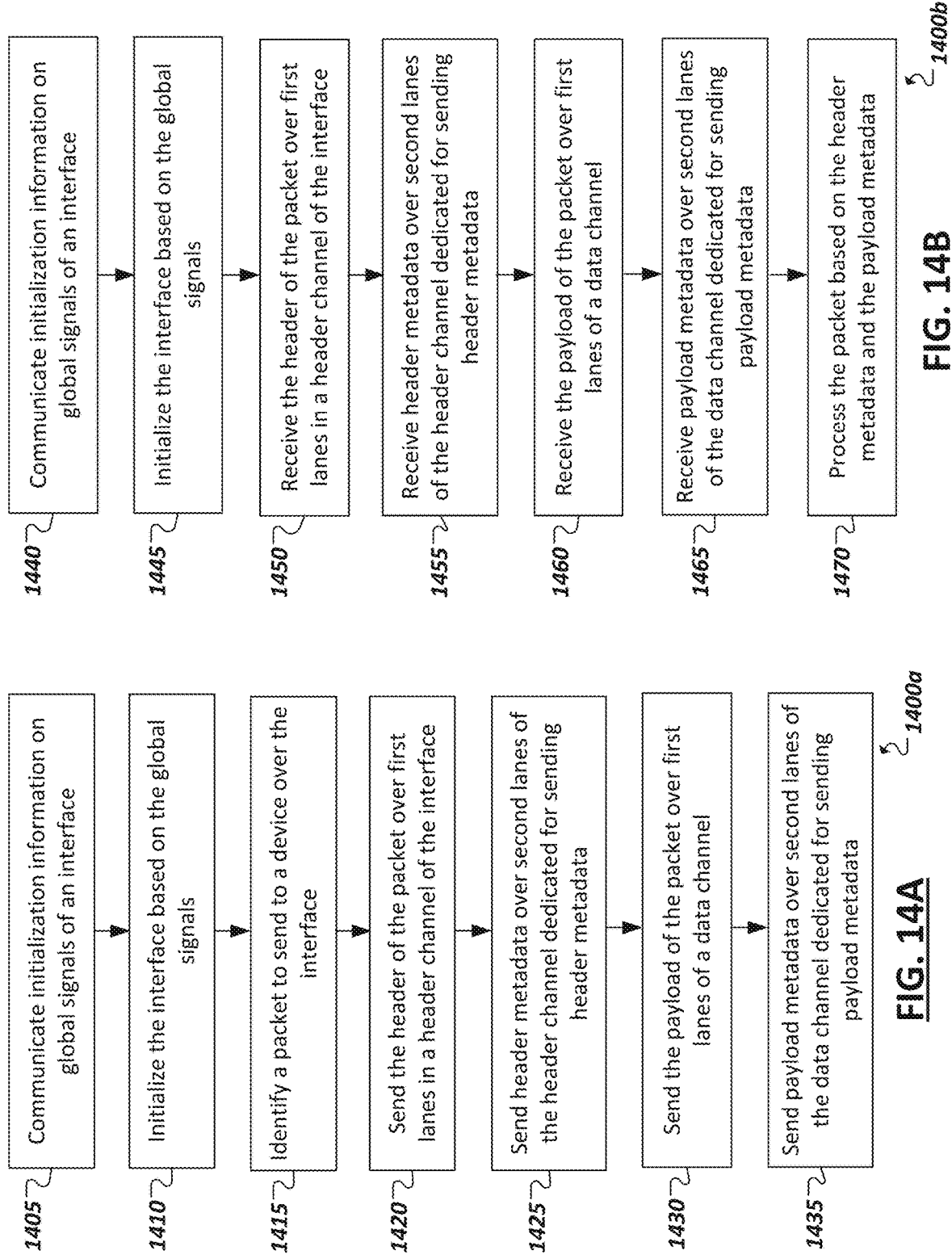
FIGS. 14A-14B are flow diagrams illustrating example techniques for signaling using an example streaming fabric interface for load/store protocols.

Turning to FIGS. 14A-14B, simplified flowcharts 1400a-b are shown illustrating example techniques for using an SFI interface, such as discussed in the example implementations herein. For instance, in the example of FIG. 14A, a SFI interface may be composed of lanes assigned to respective signals in a set of signals to send a message to a receiver in a particular one of the plurality of channels of the interface (e.g., Global, HDR, and DATA), as well as lanes assigned to signals to be received from the receiver of the message (e.g., credit return signals). A global channel may include multiple lanes to send and receive respective signals to control aspects of the interface, including the initialization of the interface. Indeed, initialization signals may be communicated 1405 on the interface to initialize 1410 the interface for the sending of messages the channels (e.g., HDR and DATA) of the interface. A packet may be identified 1415 that has been prepared by protocol layers of an agent or other logic on a device (e.g., an IP block, fabric block, gasket device, or other device) in accordance with a particular streaming or load/store protocol, such as PCIe or CXL.io, among other examples. The header and payload of the packet may be sent separately on the dedicated header (HDR) and payload (DATA) channels of the interface. For instance, the header may be sent 1420 on header bus lanes of the header channel accompanied by header metadata sent 1425 on lanes of the HDR channel dedicated to a header metadata signal. Similarly, the DATA channel may be used to send 1430 the payload data on data bus lanes of the DATA channel, and corresponding payload metadata may be sent on separate other lanes of the DATA channel implementing one or more metadata signals for the DATA channel. In some implementations, to send a header or payload on the HDR or DATA channel respectively, a valid signal may be sent on a dedicated set of one or more lanes of the corresponding channel. In some implementations, credit returns may be received by the sender of the packet corresponding to respective credits used on each of the HDR and DATA channels, among other example information and signals, which may be implemented in the HDR and DATA channels, such as discussed in the examples above.

In the example of FIG. 14B, techniques are illustrated associated with a receiver on an SFI interface. In some implementations, a single device may implement a transmitter for a first instance of an SFI interface and a receive side for a complimentary second instance of an SFI interface, among other example configurations. In one example, a global channel may also be provided on the receive side to communicate 1435 initialization signals to initialize 1440 the interface. After initialization, packet data may be received over the interface, including the header and payload data of the packet. For instance, a header of the packet may be received 1450 on lanes of the header channel, along with header metadata received 1455 on separate metadata lanes of the header channel for the header. The payload data of the packet may be received 1460 on lanes of a separate data channel. Payload metadata may be received 1465 on additional metadata lanes of the data channel to describe attributes (e.g., flow control information) of the payload. The receiver may process 1470 the packet (e.g., buffer, associate a header with its packet, decode the header, identify boundaries of the payloads sent on the data lanes, etc.) based on the header and payload metadata sent on the respective metadata lanes of the header and data channels. The receiver may also send credit returns on additional dedicated lanes of the header and data channels, among other example functionality provided by logic at the receiver.

Note that the apparatus', methods', and systems described above may be implemented in any electronic device or system as aforementioned. As specific illustrations, the figures below provide exemplary systems (e.g., SoCs, computing blocks, fabric blocks, etc.) for utilizing the solutions described herein. As the systems below are described in more detail, a number of different interconnects, use cases, topologies, and applications are disclosed, described, and revisited from the discussion above. And as is readily apparent, the advances described above may be applied to any of those interconnects, fabrics, or architectures and their composite components.

Figure 15:
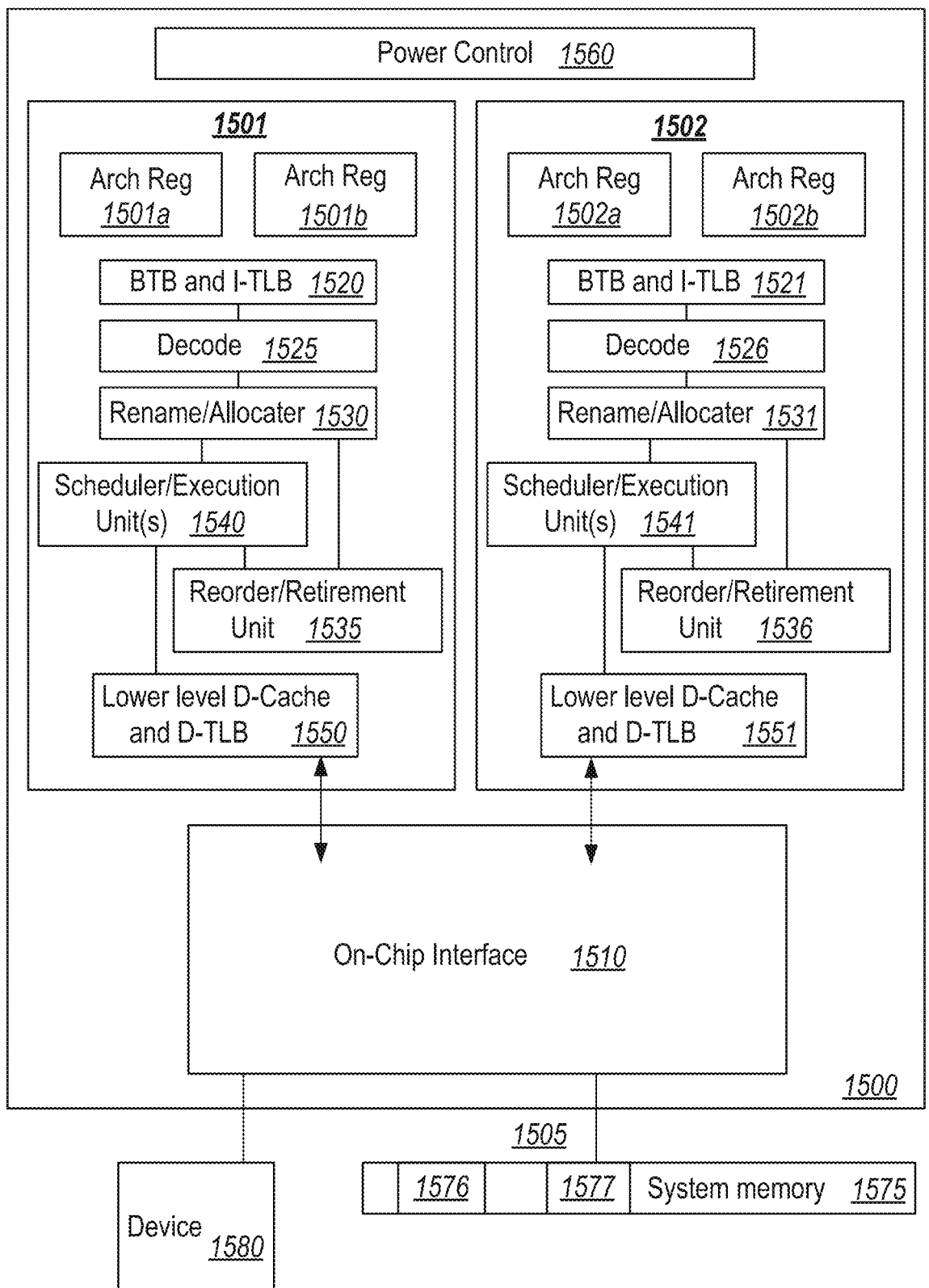
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501a and 1501b, which may also be referred to as hardware thread slots 1501a and 1501b. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501a, a second thread is associated with architecture state registers 1501b, a third thread may be associated with architecture state registers 1502a, and a fourth thread may be associated with architecture state registers 1502b. Here, each of the architecture state registers (1301a, 1501b, 1502a, and 1502b) may be referred to as processing elements, thread slots, or thread units, as described above. As illustrated, architecture state registers 1501a are replicated in architecture state registers 1501b, so individual architecture states/contexts are capable of being stored for logical processor 1501a and logical processor 1501b. In core 1501, other smaller resources, such as instruction pointers and renaming logic in allocator and renamer block 1530 may also be replicated for threads 1501a and 1501b. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501a, 1501b, respectively. Usually core 1501 is associated with a first ISA, which defines/specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501a and 1501b are potentially capable of out-of-order execution, where allocator and renamer block 1530 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache—instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1500. For example in one embodiment, a memory controller hub is on the same package and/or die with processor 1500. Here, a portion of the core (an on-core portion) 1510 includes one or more controller(s) for interfacing with other devices such as memory 1575 or a graphics device 1580. The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
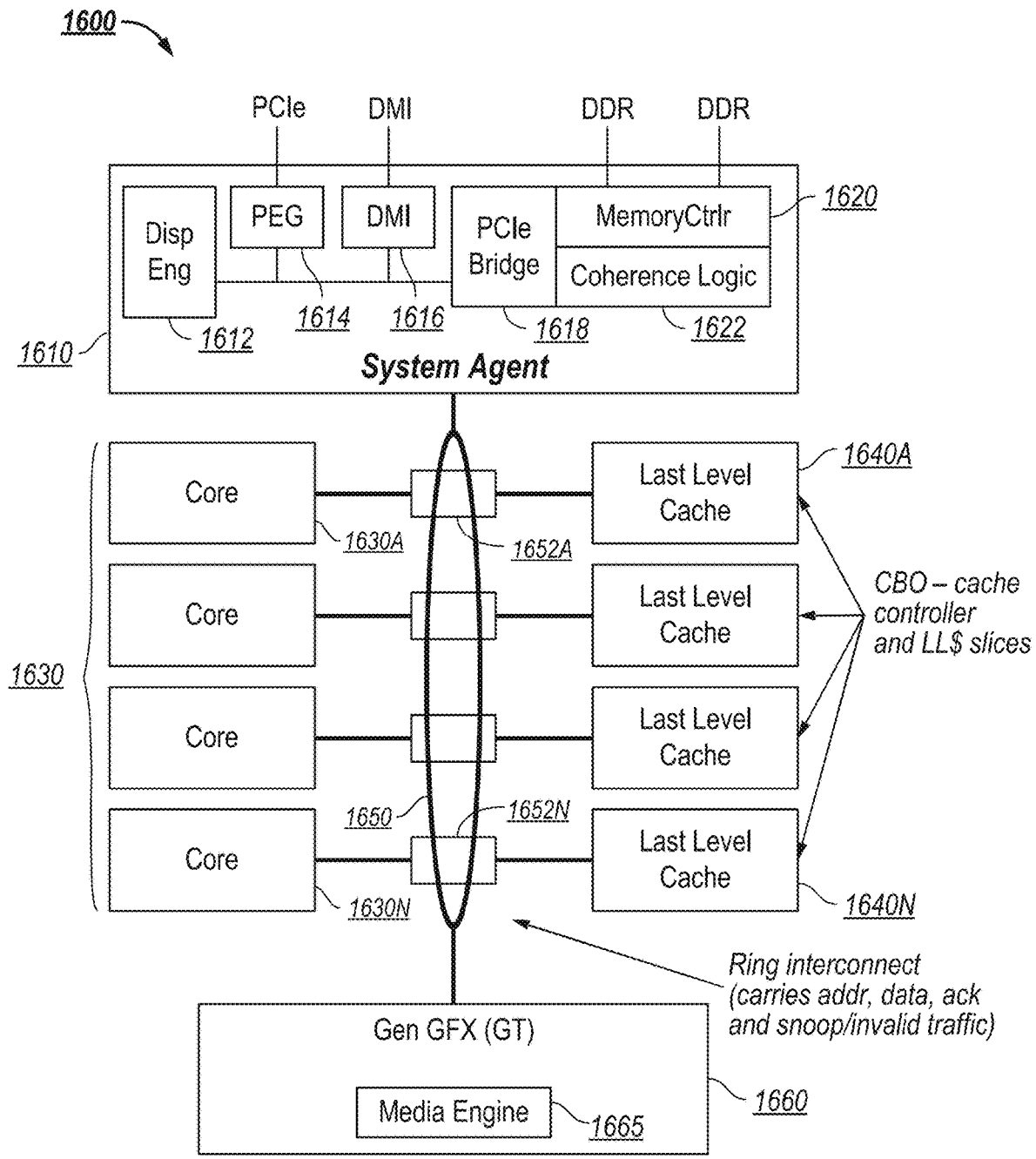
FIG. 16 illustrates another embodiment of a block diagram for a computing system including a multicore processor.

Referring now to FIG. 16, shown is a block diagram of an embodiment of a multicore processor. As shown in the embodiment of FIG. 16, processor 1600 includes multiple domains. Specifically, a core domain 1630 includes a plurality of cores 1630A-1630N, a graphics domain 1660 includes one or more graphics engines having a media engine 1665, and a system agent domain 1610.

In various embodiments, system agent domain 1610 handles power control events and power management, such that individual units of domains 1630 and 1660 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1630 and 1660 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1630 further includes low level caches in addition to various execution units and additional processing elements. Here, the various cores are coupled to each other and to a shared cache memory that is formed of a plurality of units or slices of a last level cache (LLC) 1640A-1640N; these LLCs often include storage and cache controller functionality and are shared amongst the cores, as well as potentially among the graphics engine too.

As seen, a ring interconnect 1650 couples the cores together, and provides interconnection between the core domain 1630, graphics domain 1660 and system agent circuitry 1610, via a plurality of ring stops 1652A-1652N, each at a coupling between a core and LLC slice. As seen in FIG. 16, interconnect 1650 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1610 includes display engine 1612 which is to provide control of and an interface to an associated display. System agent domain 1610 may include other units, such as: an integrated memory controller 1620 that provides for an interface to a system memory (e.g., a DRAM implemented with multiple DIMMs; coherence logic 1622 to perform memory coherence operations. Multiple interfaces may be present to enable interconnection between the processor and other circuitry. For example, in one embodiment at least one direct media interface (DMI) 1616 interface is provided as well as one or more PCIe™ interfaces 1614. The display engine and these interfaces typically couple to memory via a PCIe™ bridge 1618. Still further, to provide for communications between other agents, such as additional processors or other circuitry, one or more other interfaces may be provided.

Figure 17:
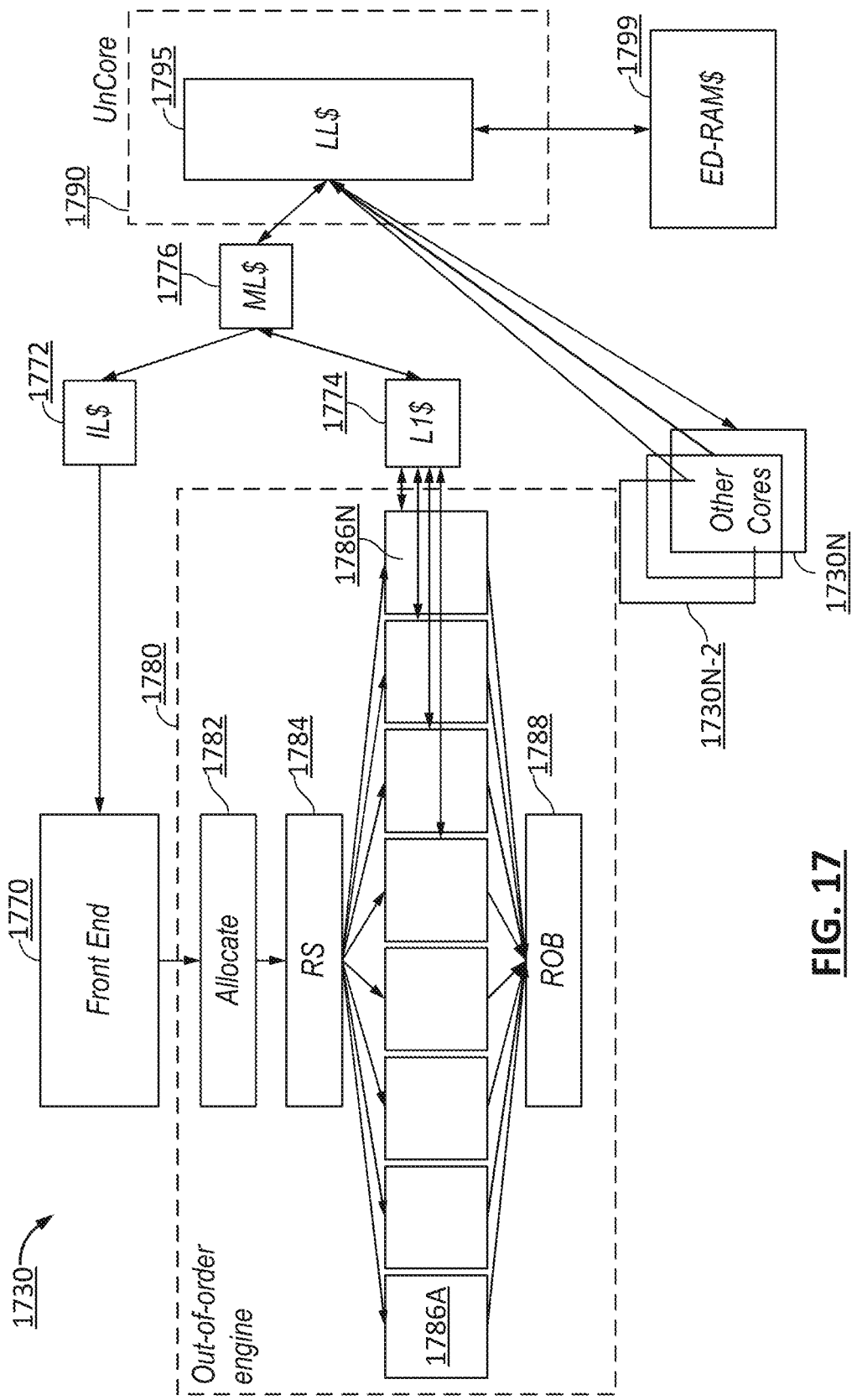
FIG. 17 illustrates an embodiment of a block diagram for a processor.

Referring now to FIG. 17, shown is a block diagram of a representative core; specifically, logical blocks of a back-end of a core, such as core 1630 from FIG. 16. In general, the structure shown in FIG. 17 includes an out-of-order processor that has a front end unit 1770 used to fetch incoming instructions, perform various processing (e.g. caching, decoding, branch predicting, etc.) and passing instructions/operations along to an out-of-order (OOO) engine 1780. OOO engine 1780 performs further processing on decoded instructions.

Specifically in the embodiment of FIG. 17, out-of-order engine 1780 includes an allocate unit 1782 to receive decoded instructions, which may be in the form of one or more micro-instructions or uops, from front end unit 1770, and allocate them to appropriate resources such as registers and so forth. Next, the instructions are provided to a reservation station 1784, which reserves resources and schedules them for execution on one of a plurality of execution units 1786A-1786N. Various types of execution units may be present, including, for example, arithmetic logic units (ALUs), load and store units, vector processing units (VPUs), floating point execution units, among others. Results from these different execution units are provided to a reorder buffer (ROB) 1788, which take unordered results and return them to correct program order.

Still referring to FIG. 17, note that both front end unit 1770 and out-of-order engine 1780 are coupled to different levels of a memory hierarchy. Specifically shown is an instruction level cache 1772, that in turn couples to a mid-level cache 1776, that in turn couples to a last level cache 1795. In one embodiment, last level cache 1795 is implemented in an on-chip (sometimes referred to as uncore) unit 1790. As an example, unit 1790 is similar to system agent 1710 of FIG. 17. As discussed above, uncore 1790 communicates with system memory 1799, which, in the illustrated embodiment, is implemented via ED RAM. Note also that the various execution units 1786 within out-of-order engine 1780 are in communication with a first level cache 1774 that also is in communication with mid-level cache 1776. Note also that additional cores 1730N-2-1730N can couple to LLC 1795. Although shown at this high level in the embodiment of FIG. 17, understand that various alterations and additional components may be present.

Figure 18:
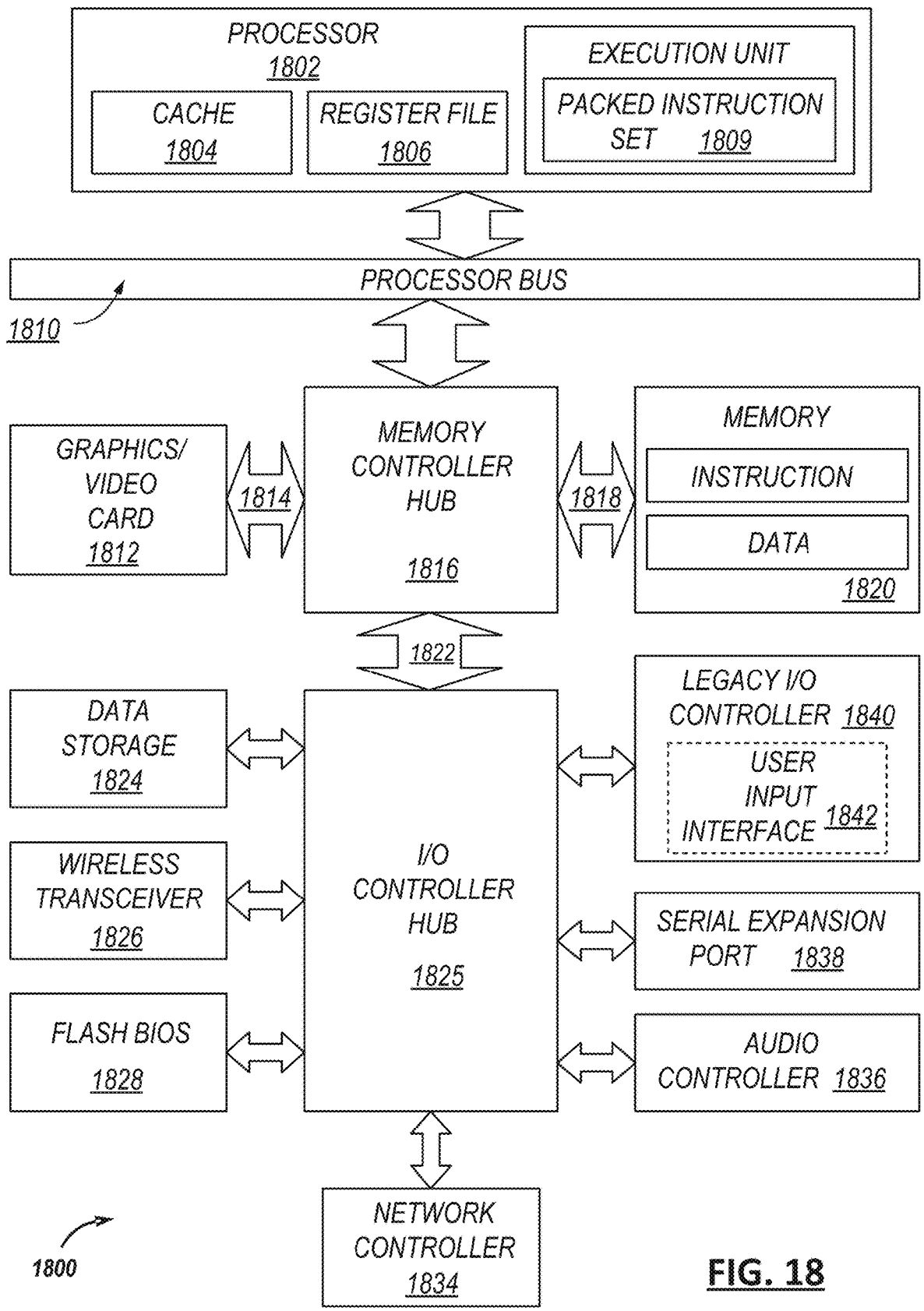
FIG. 18 illustrates another embodiment of a block diagram for a computing system including a processor.

Turning to FIG. 18, a block diagram of an exemplary computer system formed with a processor that includes execution units to execute an instruction, where one or more of the interconnects implement one or more features in accordance with one embodiment of the present disclosure is illustrated. System 1800 includes a component, such as a processor 1802 to employ execution units including logic to perform algorithms for process data, in accordance with the present disclosure, such as in the embodiment described herein. In one embodiment, sample system 1800 executes a version of an operating system and included software, and provides corresponding graphical user interfaces, may also be used. However, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1802 includes one or more execution units 1808 to implement an algorithm that is to perform at least one instruction. One embodiment may be described in the context of a single processor desktop or server system, but alternative embodiments may be included in a multiprocessor system. System 1800 is an example of a 'hub' system architecture. The computer system 1800 includes a processor 1802 to process data signals. The processor 1802, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1802 is coupled to a processor bus 1810 that transmits data signals between the processor 1802 and other components in the system 1800. The elements of system 1800 (e.g. graphics accelerator 1812, memory controller hub 1816, memory 1820, I/O controller hub 1825, wireless transceiver 1826, Flash BIOS 1828, Network controller 1834, Audio controller 1836, Serial expansion port 1838, I/O controller 1840, etc.) perform their conventional functions that are well known to those familiar with the art.

In one embodiment, the processor 1802 includes a Level 1 (L1) internal cache memory 1804. Depending on the architecture, the processor 1802 may have a single internal cache or multiple levels of internal caches. Other embodiments include a combination of both internal and external caches depending on the particular implementation and needs. Register file 1806 is to store different types of data in various registers including integer registers, floating point registers, vector registers, banked registers, shadow registers, checkpoint registers, status registers, and instruction pointer register.

Execution unit 1808, including logic to perform integer and floating point operations, also resides in the processor 1802. The processor 1802, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1802. For one embodiment, execution unit 1808 includes logic to handle a packed instruction set 1809. By including the packed instruction set 1809 in the instruction set of a general-purpose processor 1802, along with associated circuitry to execute the instructions, the operations used by many multimedia applications may be performed using packed data in a general-purpose processor 1802. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1808 may also be used in micro controllers, embedded processors, graphics devices, DSPs, and other types of logic circuits. System 1800 includes a memory 1820. Memory 1820 includes a dynamic random access memory (DRAM) device, a static random access memory (SRAM) device, flash memory device, or other memory device. Memory 1820 stores instructions and/or data represented by data signals that are to be executed by the processor 1802.

Note that any of the aforementioned features or aspects of the present disclosure and solutions may be utilized on one or more interconnect illustrated in FIG. 18. For example, an on-die interconnect (ODI), which is not shown, for coupling internal units of processor 1802 implements one or more aspects of the embodiments described above. Or the embodiments may be associated with a processor bus 1810 (e.g. other known high performance computing interconnect), a high bandwidth memory path 1818 to memory 1820, a point-to-point link to graphics accelerator 1812 (e.g. a Peripheral Component Interconnect express (PCIe) compliant fabric), a controller hub interconnect 1822, an I/O or other interconnect (e.g. USB, PCI, PCIe) for coupling the other illustrated components. Some examples of such components include the audio controller 1836, firmware hub (flash BIOS) 1828, wireless transceiver 1826, data storage 1824, legacy I/O controller 1810 containing user input and keyboard interfaces 1842, a serial expansion port 1838 such as Universal Serial Bus (USB), and a network controller 1834. The data storage device 1824 can comprise a hard disk drive, a floppy disk drive, a CD-ROM device, a flash memory device, or other mass storage device.

Figure 19:
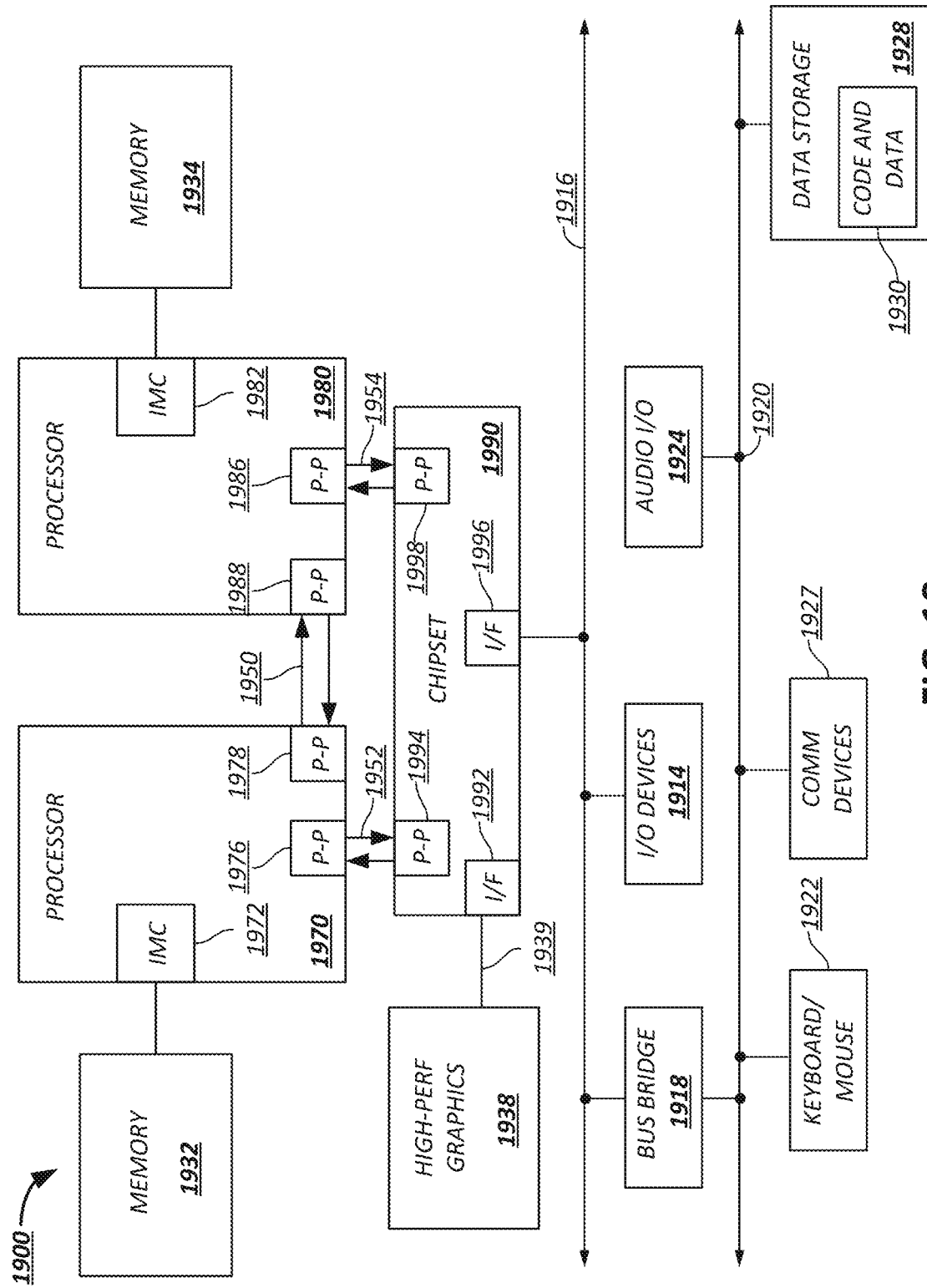
FIG. 19 illustrates an embodiment of a block for a computing system including multiple processors.

Referring now to FIG. 19, shown is a block diagram of a second system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of a processor. In one embodiment, 1952 and 1954 are part of a serial, point-to-point coherent interconnect fabric, such as a high-performance architecture.

While shown with only two processors 1970, 1980, it is to be understood that the scope of the present disclosure is not so limited. In other embodiments, one or more additional processors may be present in a given processor.

Processors 1970 and 1980 are shown including integrated memory controller units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 each exchange information with a chipset 1990 via individual P-P interfaces 1952, 1954 using point to point interface circuits 1976, 1994, 1986, 1998. Chipset 1990 also exchanges information with a high-performance graphics circuit 1938 via an interface circuit 1992 along a high-performance graphics interconnect 1939.

A shared cache (not shown) may be included in either processor or outside of both processors; yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 are coupled to first bus 1916, along with a bus bridge 1918 which couples first bus 1916 to a second bus 1920. In one embodiment, second bus 1920 includes a low pin count (LPC) bus. Various devices are coupled to second bus 1920 including, for example, a keyboard and/or mouse 1922, communication devices 1927 and a storage unit 1928 such as a disk drive or other mass storage device which often includes instructions/code and data 1930, in one embodiment. Further, an audio I/O 1924 is shown coupled to second bus 1920. Note that other architectures are possible, where the included components and interconnect architectures vary. For example, instead of the point-to-point architecture of FIG. 19, a system may implement a multi-drop bus or other such architecture.

Figure 20:
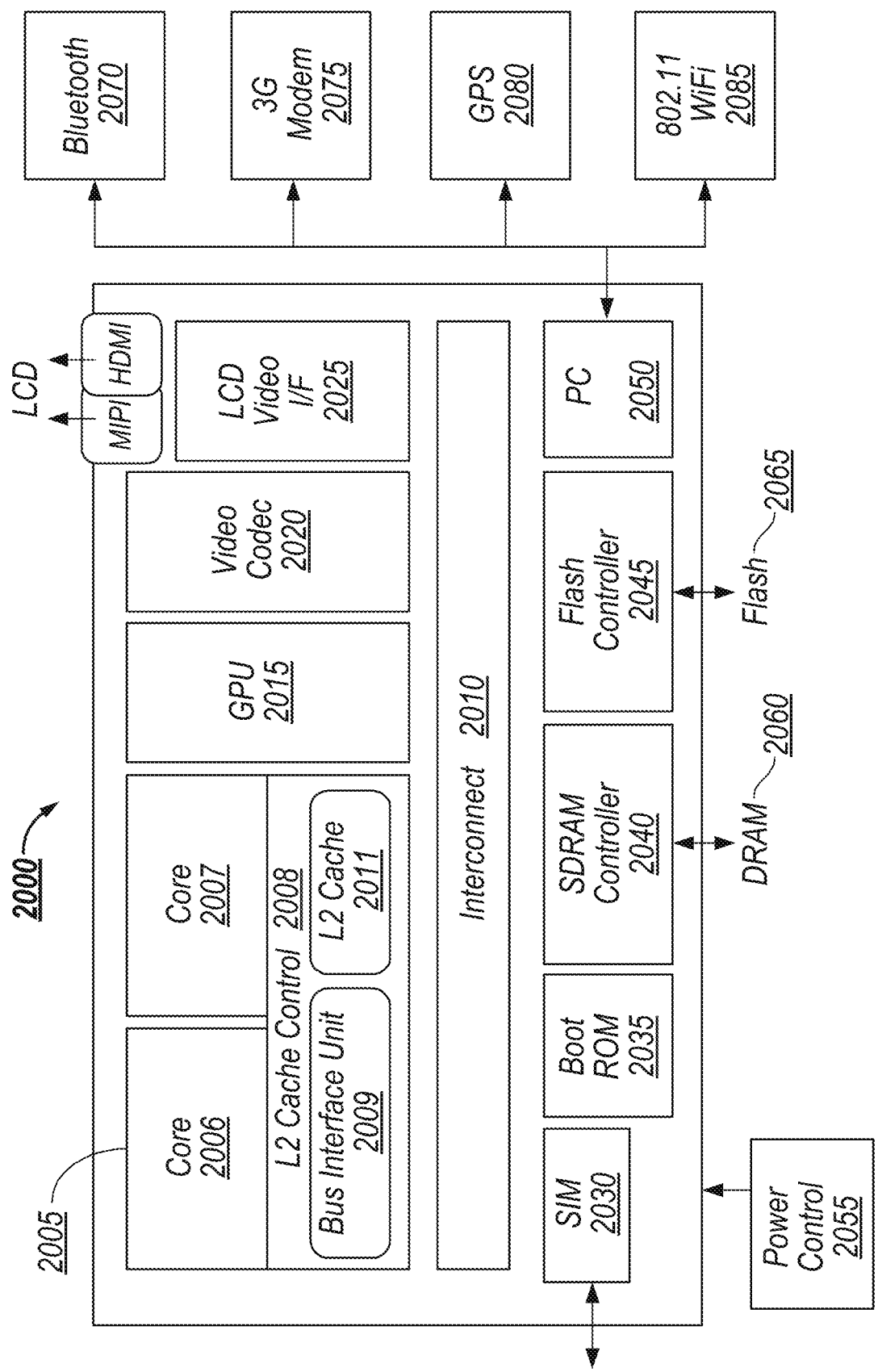
FIG. 20 illustrates an example system implemented as system on chip (SoC).

Turning next to FIG. 20, an embodiment of a system on-chip (SOC) design in accordance with the above disclosure is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or other interconnect discussed above, which potentially implements one or more aspects of described herein.

Interface 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects of the embodiments described herein.

In addition, the system illustrates peripherals for communication, such as a Bluetooth module 2070, 3G modem 2075, GPS 2085, and WiFi 2085. Note as stated above, a UE includes a radio for communication. As a result, these peripheral communication modules are not all required. However, in a UE some form a radio for external communication is to be included.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: protocol circuitry to implement a load/store interconnect protocol; and interface circuitry to implement an interface to couple to a fabric, where the interface includes: a header channel implemented on a first subset of a plurality of physical lanes, where the first subset of lanes includes first lanes to carry a header of a packet based on the interconnect protocol and second lanes to carry metadata for the header; and a data channel implemented on a separate second subset of the plurality of physical lanes, where the second subset of lanes includes third lanes to carry a payload of the packet and fourth lanes to carry metadata for the payload.

Example 2 includes the subject matter of example 1, where headers are to be transmitted over the header channel in a single clock cycle, and payloads are transmittable over multiple clock cycles.

Example 3 includes the subject matter of example 2, where the first subset of lanes further includes fifth lanes to carry another header of another packet on the header channel and sixth lanes to carry metadata for the other header, the header and the other channel are to be transmitted together in a single clock cycle on the header channel.

Example 4 includes the subject matter of example 3, where, in a subsequent clock cycle, both the first and fifth lanes are used to carry a third header of a third packet, and the size of the third header is larger than the header and the other header.

Example 5 includes the subject matter of any one of examples 1-4, where the header channel further includes a header valid signal on one of the first subset of lanes to identify valid header data on the first lanes, and the data channel further includes a data valid signal on one of the second subset of lanes to identify valid payload data on the third lanes.

Example 6 includes the subject matter of example 5, where the header valid signal is to further identify valid metadata on the second lanes, and the data valid signal is to further identify valid metadata on the fourth lanes.

Example 7 includes the subject matter of any one of examples 1-6, where the second subset of lanes further includes fifth lanes to carry a start of data signal to indicate a start of the payload on the data channel, and the start of data signal is asserted in a particular clock cycle to identify a first portion of the third lanes used in the particular clock cycle to carry the start of the payload bytes.

Example 8 includes the subject matter of example 7, where the second subset of lanes further includes sixth lanes to carry an end of data signal to indicate final bytes of the payload on the data channel, and the end of data signal is asserted in a subsequent clock cycle to identify a second portion of the third lanes used in the subsequent clock cycle to carry the final bytes of the payload.

Example 9 includes the subject matter of any one of examples 1-8, where the first subset of lanes further includes fifth lanes to carry credit returns for the header channel, and the second subset of lanes further includes sixth lanes to carry credit returns for the data channel.

Example 10 includes the subject matter of example 9, where one of credits for the header channel and credits for the data channel include shared credits.

Example 11 includes the subject matter of any one of examples 1-10, where the each of the metadata for the header and the metadata for the payload identify flow control information for the packet.

Example 12 includes the subject matter of example 11, where the flow control information is unique to the packet on the interface during transmission of the header and the payload on the interface.

Example 13 includes the subject matter of example 12, where the flow control information includes a combination of a flow control class identifier and a virtual channel identifier for the packet.

Example 14 includes the subject matter of example 13, where the interface defines a maximum number of different flow control class identifier-virtual channel identifier combinations for packets sent on the interface during a given clock cycle.

Example 15 includes the subject matter of any one of examples 11-14, where the metadata for the header further includes parity information, header size information, and indicates whether payload data is associated with the header.

Example 16 includes the subject matter of any one of examples 1-15, where the interface further includes a global channel implemented on a third subset of the plurality of physical lanes, the global channel is to carry control signals for the interface.

Example 17 includes the subject matter of example 16, where the control signals include a set of initialization signals for use in connection and disconnection flows for the interface.

Example 18 includes the subject matter of example 17, where the connection and disconnection flows are according to an initialization state machine, and transitions between states defined in the initialization state machine are caused by values of the set of initialization signals.

Example 19 includes the subject matter of any one of examples 1-18, where a plurality of headers are to be carried on the header channel before transmission of the payload is completed.

Example 20 includes the subject matter of any one of examples 1-19, where the interface includes a first instance of the interface to send packets to the fabric, and the apparatus further includes a second instance of the interface to receive packets from the fabric, where the second instance of the interface includes a second header channel and a second data channel.

Example 21 includes the subject matter of example 20, further includes memory to implement a receiver buffer for the second instance of the interface, where the receiver buffer supports credit sharing between flow control classes or virtual channels.

Example 22 includes the subject matter of any one of examples 1-21, where the load/store interconnect protocol includes a Peripheral Component Interconnect Express (PCIe) protocol.

Example 23 includes the subject matter of example 22, where the PCIe protocol includes PCIe generation 6.

Example 24 includes the subject matter of any one of examples 1-23, where the load/store interconnect protocol includes a Compute Express Link (CXL) protocol, and the CXL protocol includes CXL.io.

Example 25 includes the subject matter of any one of examples 1-24, where the fabric includes an interconnect fabric of a system on chip (SoC) device, and the apparatus further includes compute circuitry to implement a block of the SoC.

Example 26 is an apparatus including: fabric circuitry to implement at least a portion of an interconnect fabric of a system; and interface circuitry to implement an interface to couple to a computing device, where the interface includes: a header channel implemented on a first subset of a plurality of physical lanes, where the first subset of lanes includes first lanes to carry a header of a packet based on the interconnect protocol and second lanes to carry metadata for the header; and a data channel implemented on a separate second subset of the plurality of physical lanes, where the second subset of lanes includes third lanes to carry a payload of the packet and fourth lanes to carry metadata for the payload.

Example 27 includes the subject matter of example 26, where headers are to be transmitted over the header channel in a single clock cycle, and payloads are transmittable over multiple clock cycles.

Example 28 includes the subject matter of example 27, where the first subset of lanes further includes fifth lanes to carry another header of another packet on the header channel and sixth lanes to carry metadata for the other header, the header and the other channel are to be transmitted together in a single clock cycle on the header channel.

Example 29 includes the subject matter of example 28, where, in a subsequent clock cycle, both the first and fifth lanes are used to carry a third header of a third packet, and the size of the third header is larger than the header and the other header.

Example 30 includes the subject matter of any one of examples 26-29, where the header channel further includes a header valid signal on one of the first subset of lanes to identify valid header data on the first lanes, and the data channel further includes a data valid signal on one of the second subset of lanes to identify valid payload data on the third lanes.

Example 31 includes the subject matter of example 30, where the header valid signal is to further identify valid metadata on the second lanes, and the data valid signal is to further identify valid metadata on the fourth lanes.

Example 32 includes the subject matter of any one of examples 26-31, where the second subset of lanes further includes fifth lanes to carry a start of data signal to indicate a start of the payload on the data channel, and the start of data signal is asserted in a particular clock cycle to identify a first portion of the third lanes used in the particular clock cycle to carry the start of the payload bytes.

Example 33 includes the subject matter of example 32, where the second subset of lanes further includes sixth lanes to carry an end of data signal to indicate final bytes of the payload on the data channel, and the end of data signal is asserted in a subsequent clock cycle to identify a second portion of the third lanes used in the subsequent clock cycle to carry the final bytes of the payload.

Example 34 includes the subject matter of any one of examples 26-33, where the first subset of lanes further includes fifth lanes to carry credit returns for the header channel, and the second subset of lanes further includes sixth lanes to carry credit returns for the data channel.

Example 35 includes the subject matter of example 34, where one of credits for the header channel and credits for the data channel include shared credits.

Example 36 includes the subject matter of any one of examples 26-35, where the each of the metadata for the header and the metadata for the payload identify flow control information for the packet.

Example 37 includes the subject matter of example 36, where the flow control information is unique to the packet on the interface during transmission of the header and the payload on the interface.

Example 38 includes the subject matter of example 37, where the flow control information includes a combination of a flow control class identifier and a virtual channel identifier for the packet.

Example 39 includes the subject matter of example 38, where the interface defines a maximum number of different flow control class identifier-virtual channel identifier combinations for packets sent on the interface during a given clock cycle.

Example 40 includes the subject matter of any one of examples 36-39, where the metadata for the header further includes parity information, header size information, and indicates whether payload data is associated with the header.

Example 41 includes the subject matter of any one of examples 26-40, where the interface further includes a global channel implemented on a third subset of the plurality of physical lanes, the global channel is to carry control signals for the interface.

Example 42 includes the subject matter of example 41, where the control signals include a set of initialization signals for use in connection and disconnection flows for the interface.

Example 43 includes the subject matter of example 42, where the connection and disconnection flows are according to an initialization state machine, and transitions between states defined in the initialization state machine are caused by values of the set of initialization signals.

Example 44 includes the subject matter of any one of examples 26-43, where a plurality of headers are to be carried on the header channel before transmission of the payload is completed.

Example 45 includes the subject matter of any one of examples 26-44, where the interface includes a first instance of the interface to send packets to the fabric, and the apparatus further includes a second instance of the interface to receive packets from the fabric, where the second instance of the interface includes a second header channel and a second data channel.

Example 46 includes the subject matter of example 45, further includes memory to implement a receiver buffer for the second instance of the interface, where the receiver buffer supports credit sharing between flow control classes or virtual channels.

Example 47 includes the subject matter of any one of examples 26-46, where the load/store interconnect protocol includes a Peripheral Component Interconnect Express (PCIe) protocol.

Example 48 includes the subject matter of example 47, where the PCIe protocol includes PCIe generation 6.

Example 49 includes the subject matter of any one of examples 26-8, where the load/store interconnect protocol includes a Compute Express Link (CXL) protocol, and the CXL protocol includes CXL.io.

Example 50 includes the subject matter of any one of examples 26-49, where the system includes a system on chip (SoC) device, and the computing device includes a block of the SoC device.

Example 51 is a method including: receiving a header of a packet from a device over an interface, where the interface includes a header channel implemented on a first plurality of physical lanes and a data channel implemented on a separate, second plurality of physical lanes, where the header is received on a first subset of the first plurality of lanes; receiving header metadata for the header on a second subset of the first plurality of lanes of the header channel; receiving payload data of the packet from the device on the data channel of the interface, where the payload data is received on a first subset of the second plurality of lanes; receiving payload metadata for the payload data on a second subset of the second plurality of lanes; and determining that the payload data is associated with the header based on the header metadata and payload metadata.

Example 52 includes the subject matter of example 51, further including decoding the header based on the header metadata.

Example 53 includes the subject matter of any one of examples 51-52, further including: sending header credit returns to the device on a third subset of the first plurality of lanes, where the header credit returns include credit returns for the header channel; and sending data credit returns to the device on a third subset of the second plurality of lanes, where the data credit returns include credit returns for the data channel.

Example 54 includes the subject matter of example 53, where one of the header credit returns or the data credit returns include shared credits.

Example 55 includes the subject matter of any one of examples 51-54, where the header includes a first header of a first packet, the first header is received from the device over the data channel in a particular clock cycle, and the method further includes receiving a second header of a second packet on the first plurality of lanes in the particular clock cycle.

Example 56 includes the subject matter of example 55, further including receiving header metadata for the second packet on a third subset of the first plurality of lanes, where header metadata for the first and second headers are both received in the particular clock cycle.

Example 57 includes the subject matter of example 55, further including receiving, in a subsequent a clock cycle, a third header of a third packet, where the third header is carried on the lanes used to carry the first header and a portion of the lanes used to carry the second header.

Example 58 includes the subject matter of any one of examples 51-57, further including: identifying assertion of a header valid signal on a valid signal lane in the first plurality of lanes, where the header valid signal identifies that valid header data is sent on the first subset of the first plurality of lanes; and identifying assertion of a data valid signal on a valid signal lane in the second plurality of lanes, where the data valid signal identifies that valid payload data is sent on the first subset of the second plurality of lanes.

Example 59 includes the subject matter of example 58, where the header valid signal is to further identify valid metadata on the second subset of the first plurality of lanes, and the data valid signal is to further identify valid metadata on the second subset of the second plurality of lanes.

Example 60 includes the subject matter of any one of examples 51-59, further including: receiving a start of data signal on a third subset of the second plurality of lanes implementing the data channel, where the start of data signal indicates a start of the payload on the data channel, and the start of data signal is asserted in a particular clock cycle to identify a first portion of the first subset of the second plurality of lanes used in the particular clock cycle to carry the start of the payload bytes.

Example 61 includes the subject matter of example 60, further including: receiving an end of data signal on a fourth subset of the second plurality of lanes implementing the data channel, where the end of data signal is asserted in a subsequent clock cycle to identify a corresponding portion of the first subset of the second plurality of lanes used in the subsequent clock cycle to carry final bytes of the payload.

Example 62 includes the subject matter of any one of examples 51-61, where each of the header metadata and the data metadata identify flow control information for the packet.

Example 63 includes the subject matter of example 62, where the flow control information is unique to the packet on the interface during transmission of the header and the payload on the interface.

Example 64 includes the subject matter of example 63, where the flow control information includes a combination of a flow control class identifier and a virtual channel identifier for the packet.

Example 65 includes the subject matter of example 64, where the interface defines a maximum number of different flow control class identifier-virtual channel identifier combinations for packets sent on the interface during a given clock cycle.

Example 66 includes the subject matter of any one of examples 62-64, where the metadata for the header further includes parity information, header size information, and indicates whether payload data is associated with the header.

Example 67 includes the subject matter of any one of examples 51-66, where the interface further includes a global channel implemented using a third plurality of physical lanes, the method further including: communicating with the device over the global channel to perform an initialization or disconnection flow for the interface.

Example 68 includes the subject matter of example 67, where global channel defines a set of control signals mapped to the third plurality of physical lanes.

Example 69 includes the subject matter of example 68, where the set of control signals include a set of initialization signals for use in the initialization and disconnection flows according to an initialization state machine, and transitions between states defined in the initialization state machine are caused by values of the set of initialization signals.

Example 70 includes the subject matter of any one of examples 51-69, further including processing the header before receipt of the payload is completed on the data channel.

Example 71 includes the subject matter of any one of examples 51-70, further including maintaining a receiver buffer for credits used on the interface.

Example 72 includes the subject matter of any one of examples 51-71, where the packet is based on a Peripheral Component Interconnect Express (PCIe) protocol.

Example 73 includes the subject matter of example 72, where the PCIe protocol includes PCIe generation 6.

Example 74 includes the subject matter of any one of examples 51-73, where the packet is based on a Compute Express Link (CXL) protocol, and the CXL protocol includes CXL.io.

Example 75 includes the subject matter of any one of examples 51-74, where the device implements at least a portion of an interconnect fabric of a system on chip (SoC) device, and the interface is to couple an agent to the interconnect fabric of the SoC device.

Example 76 includes the subject matter of any one of examples 51-75, where the device implements a compute block of an SoC device, and the interface is to couple the compute block to a fabric of the SoC device.

Example 77 is a system including means to perform the method of any one of examples 51-76.

Example 78 includes the subject matter of example 77, where the means include hardware circuitry.

Example 79 includes the subject matter of any one of examples 77-78, where the means include a non-transitory machine-readable storage medium with instructions stored thereon, the instructions executable by a processor to cause the processor to perform at least a portion of the method of any one of examples 51-76.

Example 80 is a method including: identifying a packet to be transmitted to a device over an interface; sending a header of the packet to the device over a header channel of the interface, where the header channel is implemented using a first plurality of physical lanes, where the header is sent on a first subset of the first plurality of lanes; sending header metadata for the header to the device on a second subset of the first plurality of lanes of the header channel; sending payload data of the packet to the device on a data channel of the interface, where the data channel is implemented using a separate second plurality of physical lanes, and the payload data is received on a first subset of the second plurality of lanes; and sending payload metadata for the payload data to the device on a second subset of the second plurality of lanes.

Example 81 includes the subject matter of example 80, further including: receiving header credit returns from the device on a third subset of the first plurality of lanes, where the header credit returns include credit returns for the header channel; and receiving data credit returns from the device on a third subset of the second plurality of lanes, where the data credit returns include credit returns for the data channel.

Example 82 includes the subject matter of example 81, where one of the header credit returns or the data credit returns include shared credits.

Example 83 includes the subject matter of any one of examples 80-82, where the header includes a first header of a first packet, the first header is sent in a particular clock cycle, and the method further includes sending a second header of a second packet on the first plurality of lanes in the particular clock cycle.

Example 84 includes the subject matter of example 83, further including sending header metadata for the second packet on a third subset of the first plurality of lanes, where header metadata for the first and second headers are both sent in the particular clock cycle.

Example 85 includes the subject matter of example 83, further including sending, in a subsequent a clock cycle, a third header of a third packet to the device over the data channel, where the third header is carried on the lanes used to carry the first header and a portion of the lanes used to carry the second header.

Example 86 includes the subject matter of any one of examples 80-85, further including: asserting a header valid signal on a valid signal lane in the first plurality of lanes, where the header valid signal identifies that valid header data is sent on the first subset of the first plurality of lanes; and asserting a data valid signal on a valid signal lane in the second plurality of lanes, where the data valid signal identifies that valid payload data is sent on the first subset of the second plurality of lanes.

Example 87 includes the subject matter of example 86, where the header valid signal is to further identify valid metadata on the second subset of the first plurality of lanes, and the data valid signal is to further identify valid metadata on the second subset of the second plurality of lanes.

Example 88 includes the subject matter of any one of examples 80-87, further including: sending a start of data signal on a third subset of the second plurality of lanes implementing the data channel, where the start of data signal indicates a start of the payload on the data channel, and the start of data signal is sent in a particular clock cycle to identify a first portion of the first subset of the second plurality of lanes used in the particular clock cycle to carry the start of the payload bytes.

Example 89 includes the subject matter of example 88, further including: sending an end of data signal on a fourth subset of the second plurality of lanes implementing the data channel, where the end of data signal is sent in a subsequent clock cycle to identify a corresponding portion of the first subset of the second plurality of lanes used in the subsequent clock cycle to carry final bytes of the payload.

Example 90 includes the subject matter of any one of examples 80-89, where each of the header metadata and the data metadata identify flow control information for the packet.

Example 91 includes the subject matter of example 90, where the flow control information is unique to the packet on the interface during transmission of the header and the payload on the interface.

Example 92 includes the subject matter of example 91, where the flow control information includes a combination of a flow control class identifier and a virtual channel identifier for the packet.

Example 93 includes the subject matter of example 92, where the interface defines a maximum number of different flow control class identifier-virtual channel identifier combinations for packets sent on the interface during a given clock cycle.

Example 94 includes the subject matter of any one of examples 90-93, where the metadata for the header further includes parity information, header size information, and indicates whether payload data is associated with the header.

Example 95 includes the subject matter of any one of examples 80-94, where the interface further includes a global channel implemented using a third plurality of physical lanes, the method further including: communicating with the device over the global channel to perform an initialization or disconnection flow for the interface.

Example 96 includes the subject matter of example 95, where global channel defines a set of control signals mapped to the third plurality of physical lanes.

Example 97 includes the subject matter of example 96, where the set of control signals include a set of initialization signals for use in the initialization and disconnection flows according to an initialization state machine, and transitions between states defined in the initialization state machine are caused by values of the set of initialization signals.

Example 98 includes the subject matter of any one of examples 80-97, where the packet is based on a Peripheral Component Interconnect Express (PCIe) protocol.

Example 99 includes the subject matter of example 98, where the PCIe protocol includes PCIe generation 6.

Example 100 includes the subject matter of any one of examples 80-99, where the packet is based on a Compute Express Link (CXL) protocol, and the CXL protocol includes CXL.io.

Example 101 includes the subject matter of any one of examples 80-100, where the device implements at least a portion of an interconnect fabric of a system on chip (SoC) device, and the interface is to couple an agent to the interconnect fabric of the SoC device.

Example 102 includes the subject matter of any one of examples 80-101, where the device implements a compute block of an SoC device, and the interface is to couple the compute block to a fabric of the SoC device.

Example 103 is a system including means to perform the method of any one of examples 80-102.

Example 104 includes the subject matter of example 103, where the means include hardware circuitry.

Example 105 includes the subject matter of any one of examples 103-104, where the means include a non-transitory machine-readable storage medium with instructions stored thereon, the instructions executable by a processor to cause the processor to perform at least a portion of the method of any one of examples 80-102.

Example 106 is a system including: a fabric; and a plurality of compute blocks communicatively coupled through the fabric, where a particular compute block in the plurality of compute blocks includes: agent circuitry to support a load/store interconnect protocol; and an interface circuitry interface circuitry to implement an interface to couple to a fabric, where the interface includes: a header channel implemented on a first subset of a plurality of physical lanes, where the first subset of lanes includes first lanes to carry a header of a packet based on the interconnect protocol and second lanes to carry metadata for the header; and a data channel implemented on a separate second subset of the plurality of physical lanes, where the second subset of lanes includes third lanes to carry a payload of the packet and fourth lanes to carry metadata for the payload.

Example 107 includes the subject matter of example 106, where headers are to be transmitted over the header channel in a single clock cycle, and payloads are transmittable over multiple clock cycles.

Example 108 includes the subject matter of example 107, where the first subset of lanes further includes fifth lanes to carry another header of another packet on the header channel and sixth lanes to carry metadata for the other header, the header and the other channel are to be transmitted together in a single clock cycle on the header channel.

Example 109 includes the subject matter of example 108, where, in a subsequent clock cycle, both the first and fifth lanes are used to carry a third header of a third packet, and the size of the third header is larger than the header and the other header.

Example 110 includes the subject matter of any one of examples 106-109, where the header channel further includes a header valid signal on one of the first subset of lanes to identify valid header data on the first lanes, and the data channel further includes a data valid signal on one of the second subset of lanes to identify valid payload data on the third lanes.

Example 111 includes the subject matter of example 110, where the header valid signal is to further identify valid metadata on the second lanes, and the data valid signal is to further identify valid metadata on the fourth lanes.

Example 112 includes the subject matter of any one of examples 106-111, where the second subset of lanes further includes fifth lanes to carry a start of data signal to indicate a start of the payload on the data channel, and the start of data signal is asserted in a particular clock cycle to identify a first portion of the third lanes used in the particular clock cycle to carry the start of the payload bytes.

Example 113 includes the subject matter of example 112, where the second subset of lanes further includes sixth lanes to carry an end of data signal to indicate final bytes of the payload on the data channel, and the end of data signal is asserted in a subsequent clock cycle to identify a second portion of the third lanes used in the subsequent clock cycle to carry the final bytes of the payload.

Example 114 includes the subject matter of any one of examples 106-112, where the first subset of lanes further includes fifth lanes to carry credit returns for the header channel, and the second subset of lanes further includes sixth lanes to carry credit returns for the data channel.

Example 115 includes the subject matter of example 114, where one of credits for the header channel and credits for the data channel include shared credits.

Example 116 includes the subject matter of any one of examples 106-115, where the each of the metadata for the header and the metadata for the payload identify flow control information for the packet.

Example 117 includes the subject matter of example 116, where the flow control information is unique to the packet on the interface during transmission of the header and the payload on the interface.

Example 118 includes the subject matter of example 117, where the flow control information includes a combination of a flow control class identifier and a virtual channel identifier for the packet.

Example 119 includes the subject matter of example 118, where the interface defines a maximum number of different flow control class identifier-virtual channel identifier combinations for packets sent on the interface during a given clock cycle.

Example 120 includes the subject matter of any one of examples 116-119, where the metadata for the header further includes parity information, header size information, and indicates whether payload data is associated with the header.

Example 121 includes the subject matter of any one of examples 106-120, where the interface further includes a global channel implemented on a third subset of the plurality of physical lanes, the global channel is to carry control signals for the interface.

Example 122 includes the subject matter of example 121, where the control signals include a set of initialization signals for use in connection and disconnection flows for the interface.

Example 123 includes the subject matter of example 122, where the connection and disconnection flows are according to an initialization state machine, and transitions between states defined in the initialization state machine are caused by values of the set of initialization signals.

Example 124 includes the subject matter of any one of examples 106-123, where a plurality of headers are to be carried on the header channel before transmission of the payload is completed.

Example 125 includes the subject matter of any one of examples 106-124, where the interface includes a first instance of the interface to send packets to the fabric, and the system further includes a second instance of the interface to receive packets from the fabric, where the second instance of the interface includes a second header channel and a second data channel.

Example 126 includes the subject matter of example 125, further includes memory to implement a receiver buffer for the second instance of the interface, where the receiver buffer supports credit sharing between flow control classes or virtual channels.

Example 127 includes the subject matter of any one of examples 106-126, where the load/store interconnect protocol includes a Peripheral Component Interconnect Express (PCIe) protocol.

Example 128 includes the subject matter of example 127, where the PCIe protocol includes PCIe generation 6.

Example 129 includes the subject matter of any one of examples 106-128, where the load/store interconnect protocol includes a Compute Express Link (CXL) protocol, and the CXL protocol includes CXL.io.

Example 130 includes the subject matter of any one of examples 106-129, further including a system on chip (SoC) device, and the SoC device includes the fabric and the plurality of compute blocks.

Example 131 includes the subject matter of any one of examples 106-130, further including a server.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
  a first circuitry block comprising a streaming interface, wherein the streaming interface is to map a load/store protocol between the first circuitry block and a second circuitry block, wherein the streaming interface comprises a header channel and a data channel, wherein the first circuitry block is to:
    send headers of packets of the load/store protocol on the header channel, wherein the header channel comprises first lanes to carry the headers, second lanes to carry a first valid signal associated with the header channel, and third lanes to carry credit return information for the header channel; and
    send request data of the packets on the data channel, wherein the data channel comprises fourth lanes to carry the request data, fifth lanes to carry a second valid signal associated with the data channel, and sixth lanes to carry credit return information for the data channel.

2. The apparatus of claim 1, wherein the first valid signal indicates a start of a new header of a new packet sent on the first lanes and the second valid signal indicates that request data corresponding to at least one packet is sent on the fourth lanes.

3. The apparatus of claim 1, wherein credit returns for the header channel are to be made to a first credit pool comprising dedicated credits and shared credits for the header channel, and credit returns for the data channel are to be made to a first credit pool comprising dedicated credits and shared credits the data channel.

4. The apparatus of claim 1, wherein the streaming interface further comprises seventh lanes to carry header metadata for the headers, and the header metadata comprises header size, flow control, virtual channel, and parity information.

5. The apparatus of claim 1, wherein the streaming interface further comprises a global channel implemented on seventh lanes to carry signals for use in initialization and shutdown of the streaming interface.

6. The apparatus of claim 1, wherein one header is to be sent on the first lanes within a single clock cycle.

7. The apparatus of claim 6, wherein a plurality of headers are to be sent on the first lanes within a single clock cycle, and the plurality of headers comprise the one header.

8. The apparatus of claim 1, wherein the streaming interface comprises a first streaming interface instance to send packets from the first circuitry block to the second circuitry block, and the apparatus comprises a second streaming interface instance to receive packets at the first circuitry block from the second circuitry block, wherein the first and second streaming interface instances each comprise respective instances of the header channel and the data channel.

9. The apparatus of claim 1, wherein the load/store protocol is based on a Peripheral Component Interconnect Express (PCIe)-based protocol.

10. The apparatus of claim 1, wherein the load/store protocol is based on a Compute Express Link input/output (CXL.io) protocol.

11. A method comprising:
  identifying a set of packets to send on an interconnect;
    sending the set of packets from an application layer block to a controller block over a streaming interface, wherein the streaming interface comprises a header channel comprising a first set of lanes and a data channel comprising a second set of lanes, wherein sending the set of packets from the application layer block to the controller block comprises:
      sending a header valid signal on header valid lanes in the first set of lanes;
      sending headers for the set of packets on header lanes in the first set of lanes;
      sending header information on header information lanes in the first set of lanes;
      sending a data valid signal on data valid lanes in the second set of lanes; and
      sending request data of the set of packets on data lanes in the second set of lanes;
    receiving credit return information associated with the header channel on a header credit return lane in the first set of lanes; and
    receiving credit return information associated with the data channel on a data credit return in the second set of lanes.

12. The method of claim 11, wherein the set of packets comprises a plurality of packets, and a plurality of headers associated with the plurality of packets are sent on the header lanes in a single clock cycle.

13. The method of claim 12, wherein a first valid lane in the header valid lanes is to indicate sending of a first one of the plurality of headers and a second valid lane in the header valid lanes is to indicate sending of a second one of the plurality of headers.

14. The method of claim 11, wherein the set of packets comprise transaction layer packets (TLPs) of a load/store protocol.

15. A system comprising:
a fabric; and
a compute block comprising:
an interface to couple to the fabric, wherein the interface comprises a header channel and a data channel; and
protocol circuitry to support a load/store protocol, wherein the protocol circuitry is to an interface to couple to the fabric, wherein the interface comprises:
send headers of packets of the load/store protocol on the header channel, wherein the header channel comprises first lanes to carry the headers, second lanes to carry a first valid signal associated with the header channel, and third lanes to carry credit return information for the header channel; and
send request data of the packets on the data channel, wherein the data channel comprises fourth lanes to carry the request data, fifth lanes to carry a second valid signal associated with the data channel, and sixth lanes to carry credit return information for the data channel.

16. The system of claim 15, comprising a plurality of compute blocks, wherein the fabric interconnects the plurality of compute blocks in the system.

17. The system of claim 16, wherein the system comprises a system on chip (SoC) and the SoC comprises the fabric and the plurality of compute blocks.

18. The system of claim 16, wherein the system comprises a server.

19. The system of claim 15, wherein the interface comprises a first interface to send data from the compute block to the fabric, and the compute block further comprises a second interface to receive data from the fabric, wherein the second interface comprises a respective header channel and data channel for packets to be sent from the fabric to the compute block.

20. The system of claim 15, wherein the load/store protocol comprises one of PCIe or CXL.io.

21. The system of claim 15, wherein the interface further comprises a global channel implemented on seventh lanes to carry signals for use in initialization and shutdown of the interface.

* * * * *